US008223845B1

(12) United States Patent
Duvivier

(10) Patent No.: US 8,223,845 B1
(45) Date of Patent: Jul. 17, 2012

(54) MULTITHREAD PROCESSING OF VIDEO FRAMES

(75) Inventor: Christian L. Duvivier, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 1922 days.

(21) Appl. No.: 11/083,630

(22) Filed: Mar. 16, 2005

(51) Int. Cl.
H04N 7/12 (2006.01)
H04N 11/02 (2006.01)
H04N 11/04 (2006.01)

(52) U.S. Cl. .................................. 375/240.24
(58) Field of Classification Search ............... 375/240.24
See application file for complete search history.

(56) References Cited

U.S. PATENT DOCUMENTS

| 4,876,651 A | 10/1989 | Dawson et al. |
| 5,357,604 A | 10/1994 | San et al. |
| 5,377,016 A | 12/1994 | Kashiwagi et al. |
| 5,610,660 A * | 3/1997 | Hamano et al. .......... 375/240.23 |
| 5,623,308 A * | 4/1997 | Civanlar et al. .......... 375/240.01 |
| 5,630,075 A | 5/1997 | Joshi et al. |
| 5,657,478 A | 8/1997 | Recker et al. |
| 5,754,812 A | 5/1998 | Favor et al. |
| 5,757,670 A * | 5/1998 | Ti et al. .................... 375/240.01 |
| 5,945,997 A | 8/1999 | Zhao et al. |
| 6,016,151 A | 1/2000 | Lin |
| 6,088,701 A | 7/2000 | Whaley et al. |
| 6,148,372 A | 11/2000 | Mehrotra et al. |
| 6,269,390 B1 | 7/2001 | Boland |
| 6,324,659 B1 | 11/2001 | Pierro |
| 6,353,874 B1 | 3/2002 | Morein |
| 6,470,443 B1 | 10/2002 | Emer et al. |
| 6,578,197 B1 | 6/2003 | Peercy et al. |
| 6,717,599 B1 | 4/2004 | Olano |
| 6,738,895 B1 | 5/2004 | Klein |
| 6,798,421 B2 | 9/2004 | Baldwin |
| 6,809,732 B2 | 10/2004 | Zatz et al. |

(Continued)

FOREIGN PATENT DOCUMENTS

WO WO 2008/118065 10/2008

(Continued)

OTHER PUBLICATIONS

Yabin, Yu; Dimtris, Anastassiou; Software Implementation of MPEG-ii Video Encoding Using Socket Programmin in LAN; Feb. 1994; Proc. SPIE; vol. 2187; pp. 229-240.*

(Continued)

*Primary Examiner* — Mehrdad Dastouri
*Assistant Examiner* — Jeremaiah Hallenbeck-Huber
(74) *Attorney, Agent, or Firm* — Adeli & Tollen LLP

(57) ABSTRACT

Method for determining frame slice sizes of a frame for multithreaded decoding. The frame is encoded using at least two different slice types based on size where a large-type slice is at least two times larger than a small-type slice and/or the large-type slices comprise 70-90% of the frame. In some embodiments, the number of large-type slices is equal to the number of threads available for decoding and comprise the beginning slices of the frame to be decoded before the small-type slices. Methods for multithreaded deblocking of the frame under the H.264 codec is provided where first and second threads processes first and second sections of the frame in parallel. The first section comprises macroblocks on one side of a diagonal line and the second section comprises the remainder, the diagonal line extending from a first corner of a sub-frame to a second corner of the sub-frame.

21 Claims, 16 Drawing Sheets

U.S. PATENT DOCUMENTS

| | | |
|---|---|---|
| 6,809,735 B1 | 10/2004 | Stauffer et al. |
| 6,933,945 B2 | 8/2005 | Emberling |
| 6,940,512 B2 | 9/2005 | Yamaguchi et al. |
| 6,958,757 B2 | 10/2005 | Karlov |
| 6,990,230 B2 | 1/2006 | Piponi |
| 6,995,770 B2 | 2/2006 | Ngai |
| 7,006,101 B1 | 2/2006 | Brown et al. |
| 7,015,919 B1 | 3/2006 | Stauffer et al. |
| 7,171,550 B1 | 1/2007 | Gryck et al. |
| 7,218,291 B2 | 5/2007 | Abdalla et al. |
| 7,231,632 B2 | 6/2007 | Harper |
| 7,243,216 B1 | 7/2007 | Oliver et al. |
| 7,528,840 B1 | 5/2009 | Carson et al. |
| 2003/0182539 A1 | 9/2003 | Kunkel et al. |
| 2004/0012596 A1 | 1/2004 | Allen et al. |
| 2004/0151244 A1* | 8/2004 | Kim et al. ............. 375/240.03 |
| 2005/0140672 A1 | 6/2005 | Hubbell |
| 2005/0157164 A1* | 7/2005 | Eshkoli et al. ............ 348/14.07 |
| 2006/0039483 A1* | 2/2006 | Lee et al. ............. 375/240.28 |
| 2006/0082577 A1 | 4/2006 | Carter |
| 2006/0152509 A1 | 7/2006 | Heirich |
| 2006/0152518 A1 | 7/2006 | Stauffer et al. |
| 2007/0018980 A1 | 1/2007 | Berteig et al. |
| 2007/0053430 A1* | 3/2007 | Tahira et al. ............ 375/240.04 |
| 2007/0091089 A1 | 4/2007 | Jiao et al. |
| 2008/0012874 A1 | 1/2008 | Spangler et al. |
| 2008/0303833 A1 | 12/2008 | Swift et al. |
| 2008/0303835 A1 | 12/2008 | Swift et al. |
| 2009/0189897 A1 | 7/2009 | Abbas |
| 2009/0202173 A1 | 8/2009 | Weiss et al. |
| 2009/0244079 A1 | 10/2009 | Carson et al. |
| 2010/0328325 A1 | 12/2010 | Sévigny et al. |
| 2010/0328326 A1 | 12/2010 | Hervas et al. |
| 2010/0328327 A1 | 12/2010 | Hervas et al. |
| 2010/0329564 A1 | 12/2010 | Hervas et al. |
| 2011/0058792 A1 | 3/2011 | Towner et al. |

FOREIGN PATENT DOCUMENTS

| | | |
|---|---|---|
| WO | WO 2011/031902 | 3/2011 |

OTHER PUBLICATIONS

Biles, Angelos; Fritts, Jason; Sing, Jaswinder Pal; Real-Time Parallel MPEG-2 Decoding in Software; 1997; IEEE; Parallel Processing Symposium, 1997; pp. 197-203.*

Portions of Prosecution History of U.S. Appl. No. 10/677,574, mailed Mar. 24, 2009, Carson, Kenneth M., et al.

Portions of Prosecution History of U.S. Appl. No. 12/416,080, Mailing Date Apr. 5, 2011, Carson, Kenneth M., et al.

Portions of Prosecution History of U.S. Appl. No. 12/021,295, Mailing Date Mar. 9, 2011, Abbas, Gregory B.

Portions of Prosecution History of U.S. Appl. No. 12/496,637, Mailing Date Aug. 18, 2009, Hervas, Arnaud, et al.

Portions of Prosecution History of U.S. Appl. No. 12/496,638, Mailing Date Aug. 18, 2009, Sévigny, Benoit, et al.

Portions of Prosecution History of U.S. Appl. No. 12/496,640, Mailing Date Oct. 16, 2009, Hervas, Arnaud, et al.

Portions of Prosecution History of U.S. Appl. No. 12/496,639, Mailing Date Aug. 18, 2009, Hervas, Arnaud, et al.

Invitation to Pay Additional Fees and Partial International Search Report for PCT/US2010/048324, Dec. 6, 2010 (mailing date), Apple Inc.

McCool, Michael, "Chapter 7. Shader Metaprogramming with Sh", A Short Introduction to Sh, Apr. 25, 2005, pp. 1-25.

* cited by examiner

PROCESSING TIME LINE

| CPU 1 | TIME UNIT | CPU 2 |
|---|---|---|
| 1 | 1 | * |
| 1 | 2 | * |
| 1 | 3 | * |
| 1 | 4 | * |
| 1 | 5 | * |
| 1 | 6 | * |
| 1 | 7 | * |
| 2 | 8 | A |
| 2 | 9 | A |
| 2 | 10 | * |
| 2 | 11 | * |
| 2 | 12 | * |
| 2 | 13 | * |
| 3 | 14 | B |
| 3 | 15 | B |
| 3 | 16 | B |
| 3 | 17 | * |
| 3 | 18 | * |
| 4 | 19 | C |
| 4 | 20 | C |
| 4 | 21 | C |
| 4 | 22 | C |
| 5 | 23 | D |
| 5 | 24 | D |
| 5 | 25 | D |
| * | 26 | D |
| * | 27 | D |
| * | 28 | E |
| * | 29 | E |
| * | 30 | E |
| * | 31 | E |
| * | 32 | E |
| * | 33 | E |

*Figure 11*

MULTITHREAD PROCESSING OF VIDEO FRAMES

FIELD OF THE INVENTION

The present invention is directed towards multithread processing of video frames.

BACKGROUND OF THE INVENTION

Video codecs (COmpressor-DECompressor) are compression algorithms designed to encode/compress and decode/decompress video data streams to reduce the size of the streams for faster transmission and smaller storage space. While lossy, video codecs attempt to maintain video quality while compressing the binary data of a video stream. Video codecs are typically implemented in both hardware and software. Examples of popular video codecs are MPEG-4, AVI, WMV, RM, RV, H.261, H.263, and H.264.

A video stream is comprised of a sequence of video frames where each frame is comprised of multiple macroblocks. A video codec encodes each frame in the sequence by dividing the frame into slices or sub-portions, each slice containing an integer number of macroblocks. Each macroblock is typically a 16×16 array of luminance pixels, although other sizes of macroblocks are also possible. The number of macroblocks per slice (i.e., slice size) and number of slices per frame (i.e., slice number) is determined by the video codec. Typically, the video frame is divided into even sized slices so that each slice contains the same number of macroblocks. A slice can be measured by the percentage of the frame that the slice comprises. For example, a frame can be divided into five even slices where each slice comprises 20% of the frame.

Frames are encoded in slices to allow the frame to be later decoded/decompressed using parallel multithread processing. In multithread processing, each thread performs a single task (such as decoding a slice) so that multiple tasks can be performed simultaneously, for example, by multiple central processing units (CPUs). By dividing a frame into multiple slices, two or more slices can be decoded/decompressed simultaneously by two or more threads/CPUs. Each slice is a considered a task unit that is put into a task list that is processed by a thread pool (a set of threads). A main thread (having the task of decoding an entire frame) and the thread pool need to synchronize after all the tasks in the task list have been processed (i.e., when all the slices of a frame have been decoded).

There are, however, disadvantages to encoding a frame in slices as each slice has an amount of overhead. First, each slice requires a header that consumes memory and processing resources as it increases the encoding size and decoding time required for each frame. Second, predictive ability is lost across slice boundaries. Typically, macroblocks benefit from other macroblocks within the same slice in that information from other macroblocks can be used as predictive information for another macroblock. A macroblock in one slice, however, can not benefit from predictive information based on a macroblock in another slice. As such, the greater the number of slices per frame, the greater the amount of predictive loss per frame.

The overhead of a frame slice must be considered when determining the slice size and slice number of a frame. Dividing a frame into fewer and larger slices reduces slice overhead but causes a higher typical idle time in the threads/CPUs that decode the slices (as discussed below in relation to FIGS. 1A-B). Whereas dividing a frame into numerous smaller slices causes a lower typical idle time in the threads/CPUs that decode the slices but increases slice overhead.

FIG. 1A is a timing diagram illustrating the time required to decode two large slices comprising a video frame. A first slice is decoded by a first thread/CPU and a second slice is decoded by a second thread/CPU. The first and second slices each comprise 50% of the frame. Note that although the first and second slices are of equal size (i.e., contain the same number of macroblocks), due to processing variations, the first and second slices will be decoded at different rates so that the times for completing the decoding of the first and second slices vary. This is true even if it is assumed that the first and second slices have identical content (although typically the first and second slices have different content) and the first and second slices are processed by identical CPUs. Processing variations are caused, for example, by operating system and the other applications that are concurrently running on the system and "stealing" processing cycles of the CPUs.

Typically, each slice in the previous frame must be decoded before decoding of a next frame in the sequence can begin. This is due to the decoding methods of video codecs that use predictive information derived from previous frames thereby requiring the decoding of an entire previous frame before beginning the decoding of the next frame. As stated above, the main thread (having the task of decoding an entire frame) and the thread pool synchronize after all the slices of a frame have been decoded.

As such, a thread/CPU (referred to herein as an "idling" thread/CPU) that finishes decoding all of the slices assigned to the thread/CPU before other threads/CPUs experiences "idle time," i.e., a period of time that it does not decode a slice. "Idle time" of a thread/CPU exists when the last slice in a frame to be decoded is in the process of being decoded by another thread/CPU and there are no additional slices in the frame to be decoded. In other words, when a thread in the thread pool cannot find a task (because the task list is empty), in order to synchronize with the other threads, it has to wait for the other threads to complete their respective tasks. In general, all but one thread/CPU in a set of threads/CPUs available for processing slices of a frame (referred to herein as decoding threads/CPUs) will experience "idle time." For example, for a set of four threads/CPUs, three of the four threads/CPUs will experience "idle time" during the processing of a frame. The only thread/CPU in the set of threads/CPUs that will not experience "idle time" (i.e., will always be busy) is the last thread/CPU to finish processing of all slices of the frame assigned to the thread/CPU (referred to herein as the "non-idling" thread/CPU). The "non-idling" thread/CPU in the set of threads/CPUs is random and varies for each frame.

The duration of the "idle time" of a thread/CPU begins when the thread/CPU finishes decoding the last slice assigned to the thread/CPU and ends when the last slice in the frame is decoded by the "non-idling" thread/CPU (and hence the thread/CPU can begin decoding a slice of the next frame of the sequence). As such, the idle time of a CPU is determined, in large part, on the size of the last slice being decoded by the "non-idling" thread/CPU: typically, the larger the size of the last slice, the longer the idle time of the CPU.

In the example of FIG. 1A, there are two threads/CPUs available for decoding slices and each frame is divided into two slices each comprising 50% of the frame. Dividing a frame into such large slices reduces the amount of slice overhead but causes a higher typical idle time in the threads/CPUs. As shown in FIG. 1A, the first thread/CPU completes decoding of the slice before the second thread/CPU and experiences an idle time of duration x. In the example of FIG. 1B, a frame is divided into ten smaller slices each comprising 10% of the frame. Dividing a frame into such smaller slices reduces the typical idle time in the threads/CPUs but increases the amount of slice overhead. As shown in FIG. 1A, the first thread/CPU completes decoding all slices assigned to it before the second thread/CPU and experiences an idle time of duration y, where y is less than x.

As such, there is a need for a method for determining the slice size of a frame in a multithread environment that both reduces slice overhead and reduces the typical idle time of the threads/CPUs decoding the slices.

Also, in decoding an image frame, a deblocking/loop filter is used to reduce the appearance of macroblock borders in the image frame. As discussed above, a popular video codec is H.264. Typically however, during the filtering stage of the deblocking filter, macroblocks are processed/filtered sequentially with strict dependencies specified under the H.264 codec and are not processed/filtered in parallel using multithreading.

SUMMARY OF THE INVENTION

A method for dynamically determining frame slice sizes for a video frame in a multithreaded decoding environment is provided. In some embodiments, a frame of a video sequence is encoded and later decoded in uneven sized slices where the frame is divided into at least two different types of slices based on size, a large-type slice and a small-type slice. In some embodiments, a large-type slice is at least one and a half times larger than a small-type slice. In some embodiments, a large-type slice is at least two times larger than a small-type slice. In some embodiments, the large-type slices in total comprise 70-90% of the frame and the small-type slices in total comprise the remaining 10-30% of the frame. In some embodiments, slices of the same type may be different in size so that two large-type slices may have different sizes and/or two small-type slices may have different sizes. In some embodiments, the number of large-type slices is equal to the number of threads/CPUs that are available to decode the slices of the frame.

In some embodiments, the large-type slices comprise slices of the frame configured to be assigned for decoding first, whereas small-type slices comprise slices of the frame configured to be assigned for decoding after large-type slices. In some embodiments, the large-type slices comprise the first/beginning slices of the frame where the small-type slices comprise the remainder of frame so that the large-type slices are assigned to threads/CPUs for decoding before the small-type slices.

In some embodiments, the macroblock dependencies specified under the H.264 codec are manipulated in a way to allow multithreaded deblock filtering/processing of a video frame. In some embodiments, a first thread processes a first section of the frame and a second thread processes a second section in parallel, where the first section comprises macroblocks of the frame on one side of a diagonal line and the second section comprises macroblocks on the other side of the diagonal line. In some embodiments, the diagonal line is a line extending from a first corner of a sub-frame to a second corner of the sub-frame, the sub-frame comprising at least some of the blocks of the frame. In some embodiments, each section comprises one or more sub-sections, each sub-section of a section having an associated processing order that is determined by the position of the sub-section in the frame. In some embodiments, the frame is a luma frame having associated chroma frames where the chroma frames are processed during idle time experienced by the first and/or second thread in processing the luma frame.

BRIEF DESCRIPTION OF THE DRAWINGS

FIG. 11 conceptually illustrates a timing diagram of the multithread processing/filtering of the frame of FIG. 9.

DETAILED DESCRIPTION

In the following description, numerous details are set forth for purpose of explanation. However, one of ordinary skill in the art will realize that the invention may be practiced without the use of these specific details. In other instances, well-known structures and devices are shown in block diagram form in order not to obscure the description of the invention with unnecessary detail.

I. Determining Frame Slice Sizes

In some embodiments, a frame of a video sequence is encoded and later decoded in uneven sized slices where the frame is divided into at least two different types of slices based on size, a large-type slice and a small-type slice. In some embodiments, a large-type slice is at least one and a half times larger than a small-type slice. In some embodiments, a large-type slice is at least two times larger than a small-type slice. In some embodiments, the large-type slices in total comprise 70-90% of the frame and the small-type slices in total comprise the remaining 10-30% of the frame. In some embodiments, slices of the same type may be different in size so that two large-type slices may have different sizes and/or two small-type slices may have different sizes. In some embodiments, the number of large-type slices is equal to the number of threads/CPUs that are available to decode the slices of the frame.

In some embodiments, the large-type slices comprise slices of the frame configured to be assigned for decoding first, whereas small-type slices comprise slices of the frame configured to be assigned for decoding after large-type slices. In some embodiments, the large-type slices comprise the first/beginning slices of the frame where the small-type slices comprise the remainder of the frame so that the large-type slices are assigned to threads/CPUs for decoding before the small-type slices.

By dividing the frame into large and small-type slices where the large-type slices are assigned to be decoded first, the slice overhead remains relatively low while the typical idle time of the set of threads/CPUs decoding the slices also remains relatively low. In this way, each thread/CPU in the set will spend the bulk of its initial processing time on a large-type slice while small-type slices will keep busy any thread(s)/CPU(s) finishing the large-type slice early. When the task list is empty, a thread/CPU that has finished decoding will experience a relatively short idle time since it will usually be waiting on the decoding of a small-type slice by another thread/CPU in the set.

A: Decoding Timing Diagrams

Figure 1A:
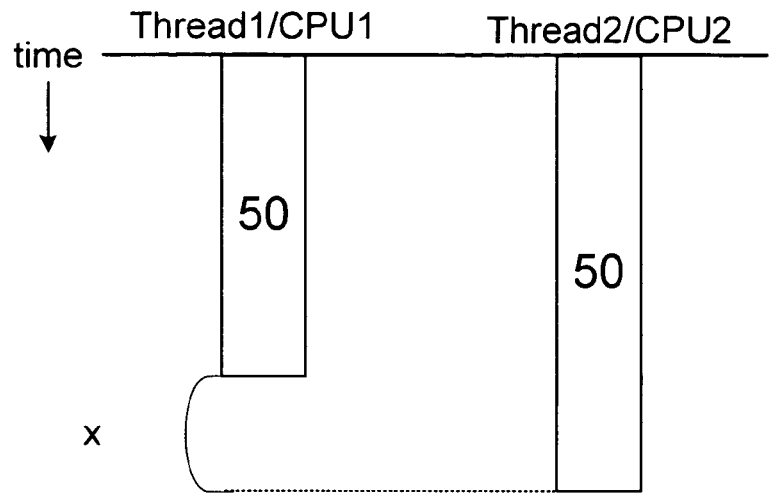
FIG. 1A is a timing diagram illustrating the time required to decode two large slices comprising a video frame.
Figure 1B:
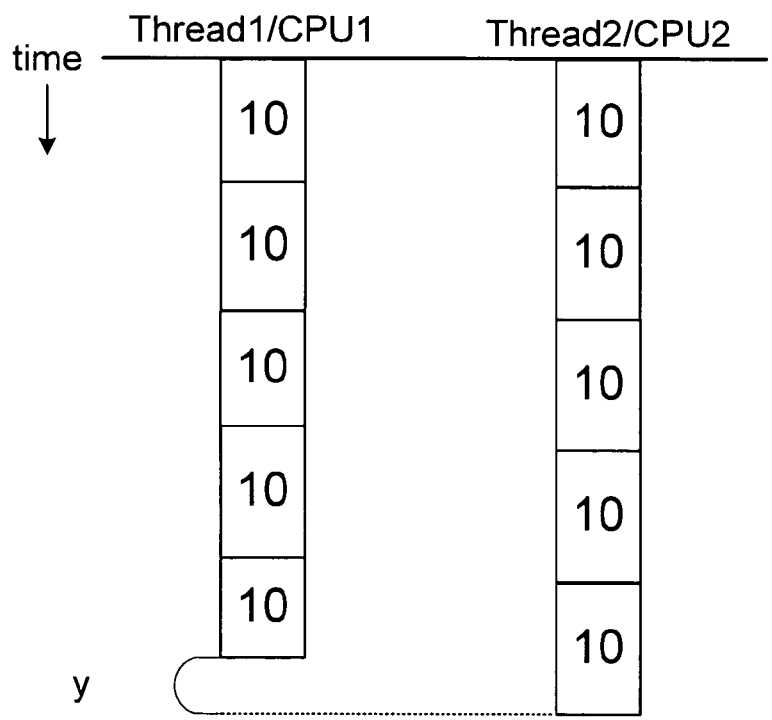
FIG. 1B is a timing diagram illustrating the time required to decode ten smaller slices comprising a video frame.
Figure 2A:
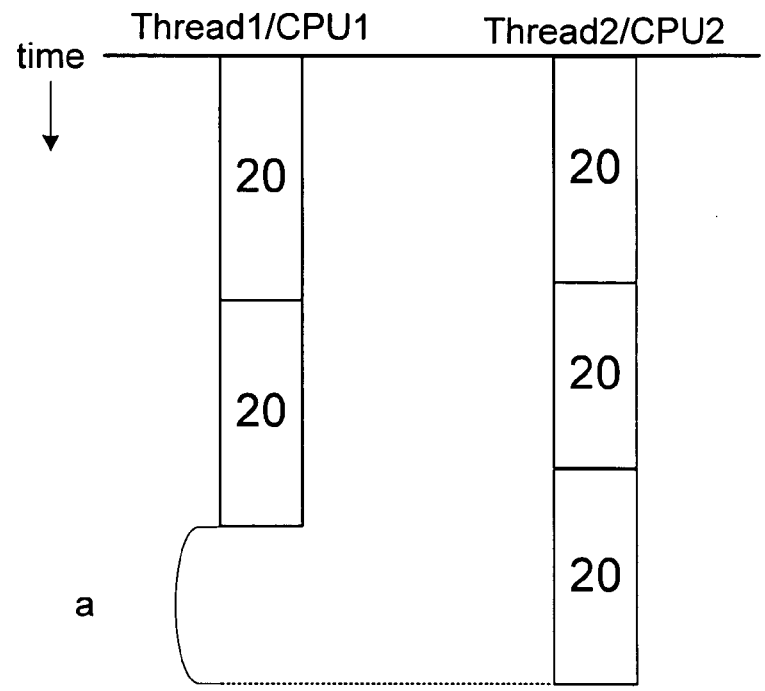
FIGS. 2A-B show exemplary timing diagrams illustrating the difference in idle times caused by dividing a frame into slices in a conventional manner as opposed to dividing a frame into slices as in the present invention.
Figure 2B:
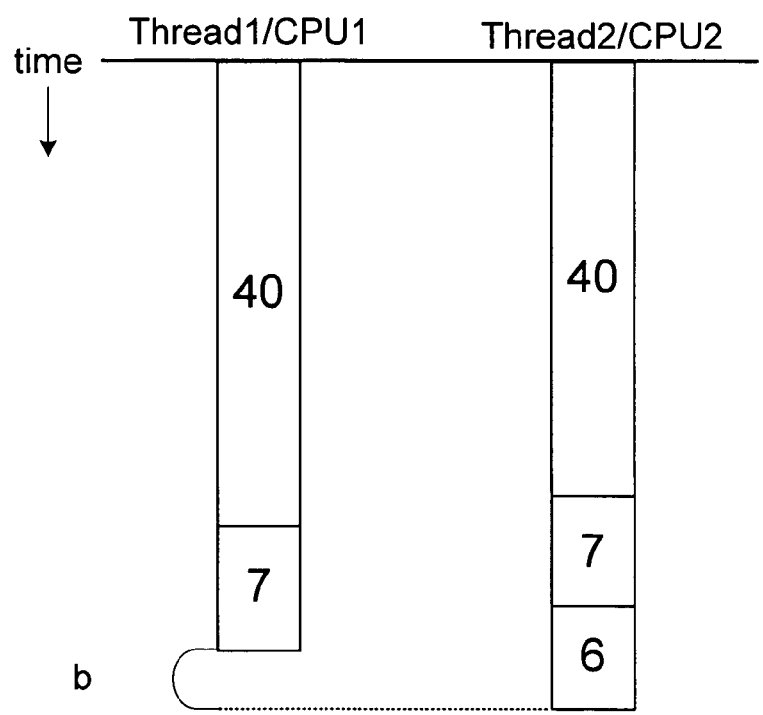

FIGS. 2A-B show exemplary timing diagrams illustrating the difference in idle times caused by dividing a frame into slices in a conventional manner as opposed to dividing a frame into slices as in the present invention. In the example of FIGS. 2A-B, a frame is divided into five slices and there are two threads/CPUs available for decoding the slices. Note that FIGS. 2A-B show only examples of implementations of the present invention, and that different slice numbers and number of threads/CPUs available for decoding are possible.

FIG. 2A shows a timing diagram of the conventional method where the slices are of equal size so that each slice comprises 20% of the frame. FIG. 2B shows a timing diagram of the methods of the present invention where the slices are of unequal size and are divided into large-type slices and small-type slices. In the example of FIG. 2B, two large-type slices each comprise 40% of the frame and three small-type slices comprise 6%, 7%, and 7% of the frame. Note that the large-type slices comprise the first slices of the frame where the small-type slices comprise the remainder of the frame so that the large-type slices are assigned to threads/CPUs for decoding before the small-type slices.

As shown in FIG. 2A, the first thread/CPU (the idling thread/CPU) completes decoding all slices assigned to it before the second thread/CPU (the non-idling thread/CPU) and experiences an idle time of duration a. As shown in FIG. 2B, the first thread/CPU (the idling thread/CPU) completes decoding all slices assigned to it before the second thread/CPU (the non-idling thread/CPU) and experiences an idle time of duration b, where b is less than a. As illustrated in FIGS. 2A-B, the methods of the present invention will typically produce a lower idle time while still having the same slice overhead of the conventional method (since in both methods, the frame is divided into five slices).

Figure 3A:
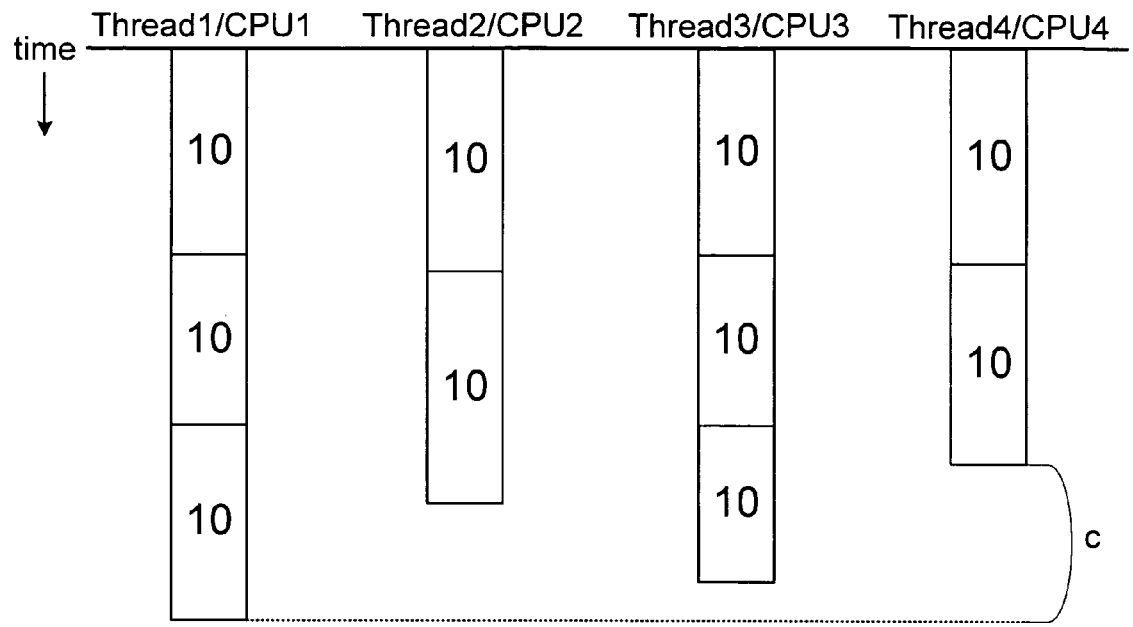
FIGS. 3A-B also show exemplary timing diagrams illustrating the difference in idle times caused by dividing a frame into slices in a conventional manner as opposed to dividing a frame into slices as in the present invention.
Figure 3B:
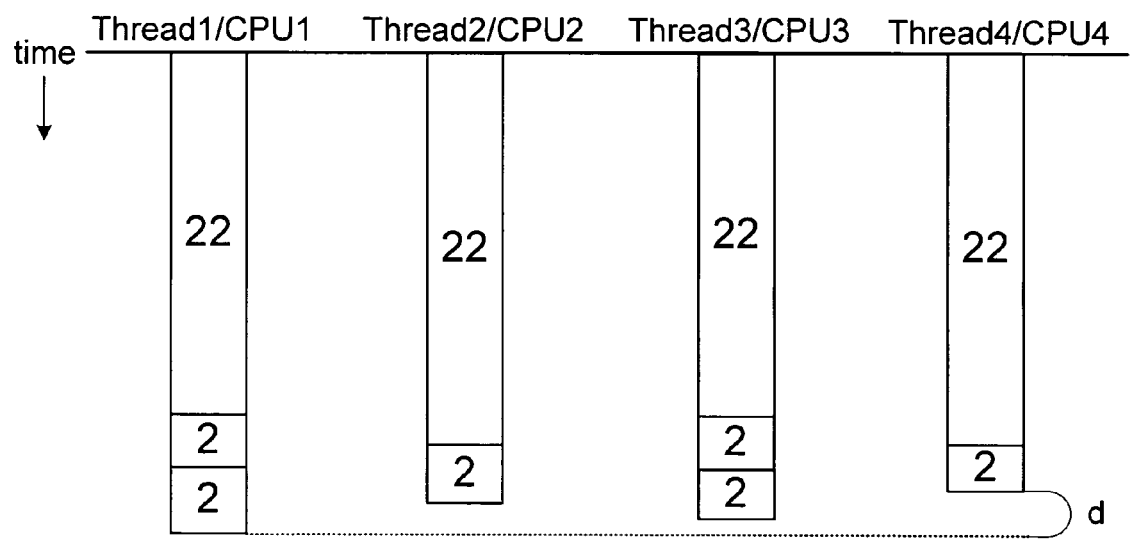

FIGS. 3A-B also show exemplary timing diagrams illustrating the difference in idle times caused by dividing a frame into slices in a conventional manner as opposed to dividing a frame into slices as in the present invention. In the example of FIGS. 3A-B, a frame is divided into ten slices and there are four threads/CPUs available for decoding the slices. FIG. 3A shows a timing diagram of the conventional method where the slices are of equal size so that each slice comprises 10% of the frame. FIG. 3B shows a timing diagram of the methods of the present invention where the slices are of unequal size and are divided into large-type slices and small-type slices. In the example of FIG. 3B, four large-type slices each comprise 22% of the frame and six small-type slices each comprise 2% of the frame. Note that the large-type slices comprise the first slices of the frame where the small-type slices comprise the remainder of the frame so that the large-type slices are assigned to threads/CPUs for decoding before the small-type slices.

As shown in FIG. 3A, the second, third, and fourth threads/CPUs (the idling threads/CPUs) complete decoding all slices assigned to them before the first thread/CPU (the non-idling thread/CPU). The longest idle time of the idling threads/CPUs is of duration c (experienced by the fourth thread/CPU). As shown in FIG. 3B, the second, third, and fourth threads/CPUs (the idling threads/CPUs) complete decoding all slices assigned to them before the first thread/CPU (the non-idling thread/CPU). The longest idle time of the idling threads/CPUs is of duration d (experienced by the fourth thread/CPU), where d is less than c. As illustrated in FIGS. 3A-B, the methods of the present invention will typically produce a lower idle time while still having the same slice overhead of the conventional method (since in both methods, the frame is divided into ten slices).

B: Method for Determining Slice Sizes

Figure 4:
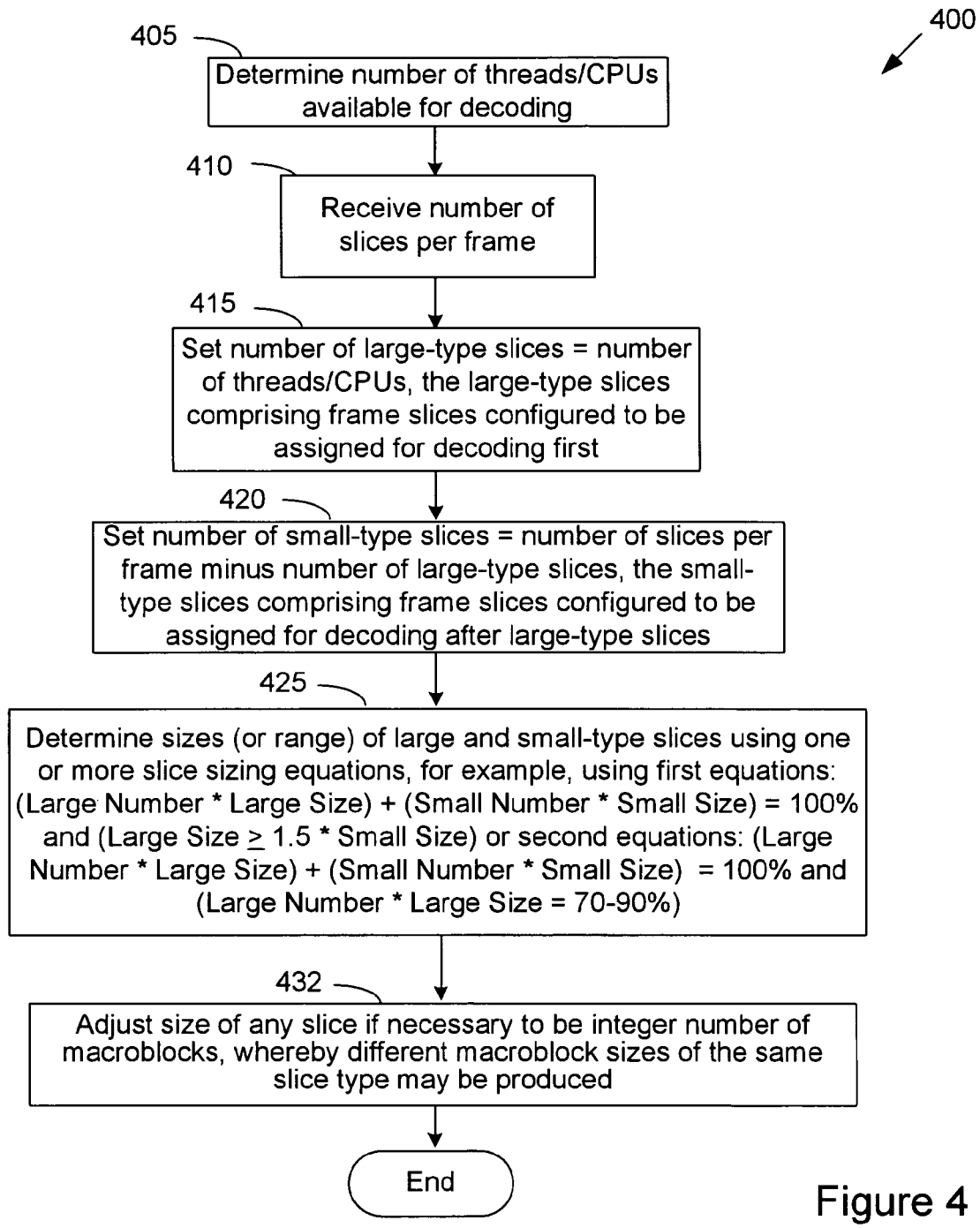
FIG. 4 shows a method for determining the slice sizes of a video frame in a multithread decoding environment.

FIG. 4 shows a flowchart of a method 400 for dynamically determining the slice sizes of a video frame in a multithread decoding environment. The method can be used to determine the size of slices of a video frame for encoding the slices of the frame. In some embodiments, the method 400 is implemented by software and/or hardware configured to encode video frames. The method begins by determining (at 405) the number of threads/CPUs that are available to decode slices of the video frame (referred to herein as decoding threads/CPUs). The method next receives (at 410) the number of slices per frame desired, the number of slices being an input parameter to the method.

The method then sets (at 415) the number of large-type slices to equal the number of available decoding threads/CPUs. The method sets (at 420) the number of small-type slices to equal the number of slices per frame minus the number of large-type slices. In some embodiments, the large-type slices comprise slices of the frame configured to be assigned for decoding first, whereas small-type slices comprise slices of the frame configured to be assigned for decoding after large-type slices. In some embodiments, the large-type slices comprise the first/beginning slices of the frame where the small-type slices comprise the remainder of frame so that the large-type slices are assigned to threads/CPUs for decoding before the small-type slices.

The method then determines (at 425) the sizes of the large and small-type slices of the frame using one or more slice sizing equations. In some embodiments, although the size of a slice is typically specified as a number of macroblocks in the slice, the size of a slice be conceptually expressed as the percentage of the frame that the slice comprises. The following description describes how slice sizes can be conceptually determined using percentage values of a frame that a slice comprises.

In some embodiments, the method uses a first set of slice sizing equations in the form:

1. (Number of large-type slices * size of a large-type slice)+(number of small-type slices * size of small-type slice) =100%; and 2. Size of a large-type slice $\geq 1.5*$ size of small-type slice.

In other embodiments, the method uses a second set of slice sizing equations in the form:

1. (Number of large-type slices * size of a large-type slice)+(number of small-type slices * size of small-type slice) =100%; and 2. Number of large-type slices * size of a large-type slice=70-90%.

The method may determine (at 425) one or more possible solutions of the one or more slice sizing equations, or a range of possible solutions for the slice sizing equations. For example, for the second set of slice sizing equations the method may determine a possible solution for the situation where (the number of large-type slices * size of a large-type slice)=70% and a possible solution for the situation where (the number of large-type slices * size of a large-type slice) =90%.

The percentage size of a slice (being equal to the percentage of the total number of macroblocks of a frame that the slice comprises) is expressed in a macroblock size (i.e., the number of macroblocks comprising the slice). If necessary, the method adjusts (at 432) the macroblock size of any large or small-type slice to be an integer number of macroblocks. As discussed above, the size of each slice must comprise an integer number of macroblocks since a slice may not include fractions of a macroblock. If this is not the case for a particular large or small-type slice, the size of the particular large or small-type slice is adjusted by the method so that it comprises an integer number of macroblocks. In some embodiments, adjustments to the slice sizes produce slices of the same type having different sizes (e.g., two or more large-type slices having different sizes and/or two or more small-type slices having different sizes). The method then ends.

As an example of the method of FIG. 4, assume there are two threads/CPUs available for decoding frames and each frame is to be divided into five slices. As such, the number of large-type slices is two and the number of small-type slices is three. Thus, the first set of slice sizing equations would be expressed as:

1. (2* size of a large-type slice)+(3* size of small-type slice)=100%; and

2. Size of a large-type slice≧1.5* size of small-type slice.

Possible solutions (after any necessary percentage size adjustments) for the first set of slice sizing equations include:

size of each large-type slice=30%, sizes of small-type slices=13%, 13%, and 14%;

size of each large-type slice=35%, size of each small-type slices=10%;

size of each large-type slice=40%, sizes of small-type slices=6%, 6%, and 7%; and size of each large-type slice=45%, sizes of small-type slices=3%, 3%, and 4%.

The second set of slice sizing equations would be expressed as:

1. (2* size of a large-type slice)+(3* size of small-type slice)=100%; and

2. Number of large-type slices * size of a large-type slice=70-90%.

Possible solutions (after any necessary percentage size adjustments) for the second set of slice sizing equations include:

size of each large-type slice=35%, size of each small-type slice=10%; and size of each large-type slice=45%, sizes of small-type slices=3%, 3%, and 4%.

The percentage sizes of the large and small-type slices derived from the first or second set of slice sizing equations is expressed as macroblock sizes (with any adjustments to the resulting macroblock sizes being made if necessary).

As a further example of the method of FIG. 4, assume there are four threads/CPUs available for decoding frames and each frame is to be divided into ten slices. As such, the number of large-type slices is four and the number of small-type slices is six. Thus, the first set of slice sizing equations would be expressed as:

1. (4* size of a large-type slice)+(6* size of small-type slice)=100%; and

2. Size of a large-type slice≧1.5* size of small-type slice.

Possible solutions (after any necessary percentage size adjustments) for the first set of slice sizing equations include:

size of each large-type slice=15%, sizes of small-type slices=6%, 6%, 7%, 7%, 7%, and 7%;

size of each large-type slice=16%, size of each small-type slice=6%; and size of each large-type slice=20%, sizes of small-type slices=3%, 3%, 3%, 3%, 4%, and 4%.

The second set of slice sizing equations would be expressed as:

1. (4* size of a large-type slice)+(6* size of small-type slice)=100%; and

2. Number of large-type slices * size of a large-type slice=70-90%.

Possible solutions (after any necessary percentage size adjustments) for the second set of slice sizing equations include:

size of each large-type slice=20%, sizes of small-type slices=3%, 3%, 3%, 3%, 4%, and 4%; and size of each large-type slice=22%, size of each small-type slice=2%.

The percentage sizes of the large and small-type slices derived from the first or second set of slice sizing equations is expressed as macroblock sizes (with any adjustments to the resulting macroblock sizes being made if necessary).

II. Multithreaded Deblock Filtering Under the H.264 Codec

In decoding an image frame, a deblocking/loop filter is used to reduce the appearance of macroblock borders in the image frame. Typically, under the H.264 codec specifications, during the filtering stage of the deblocking filter, macroblocks are processed/filtered sequentially with strict dependencies and are not processed/filtered in parallel using multithreading. The H.264 standard specifies how to filter a macroblock and that the expected result will be the one obtained when filtering the macroblock sequentially by filtering from the first row of macroblocks and going from left to right, then the second row, going from left to right, etc.

From this specification under the H.264 standard, a particular dependency order can be derived. Through manipulation of these dependencies, the macroblocks can in fact be processed in parallel by two or more threads/central processing units (CPUs). This is done by dividing a frame into sections and sub-sections in a particular manner, each sub-section being assigned to a thread/CPU for processing in a particular processing order. The processing order specified for the sub-sections are consistent with the H.264 codec specifications while also allowing parallel processing of the frame.

A. Sequential Deblock Filtering

Figure 5:
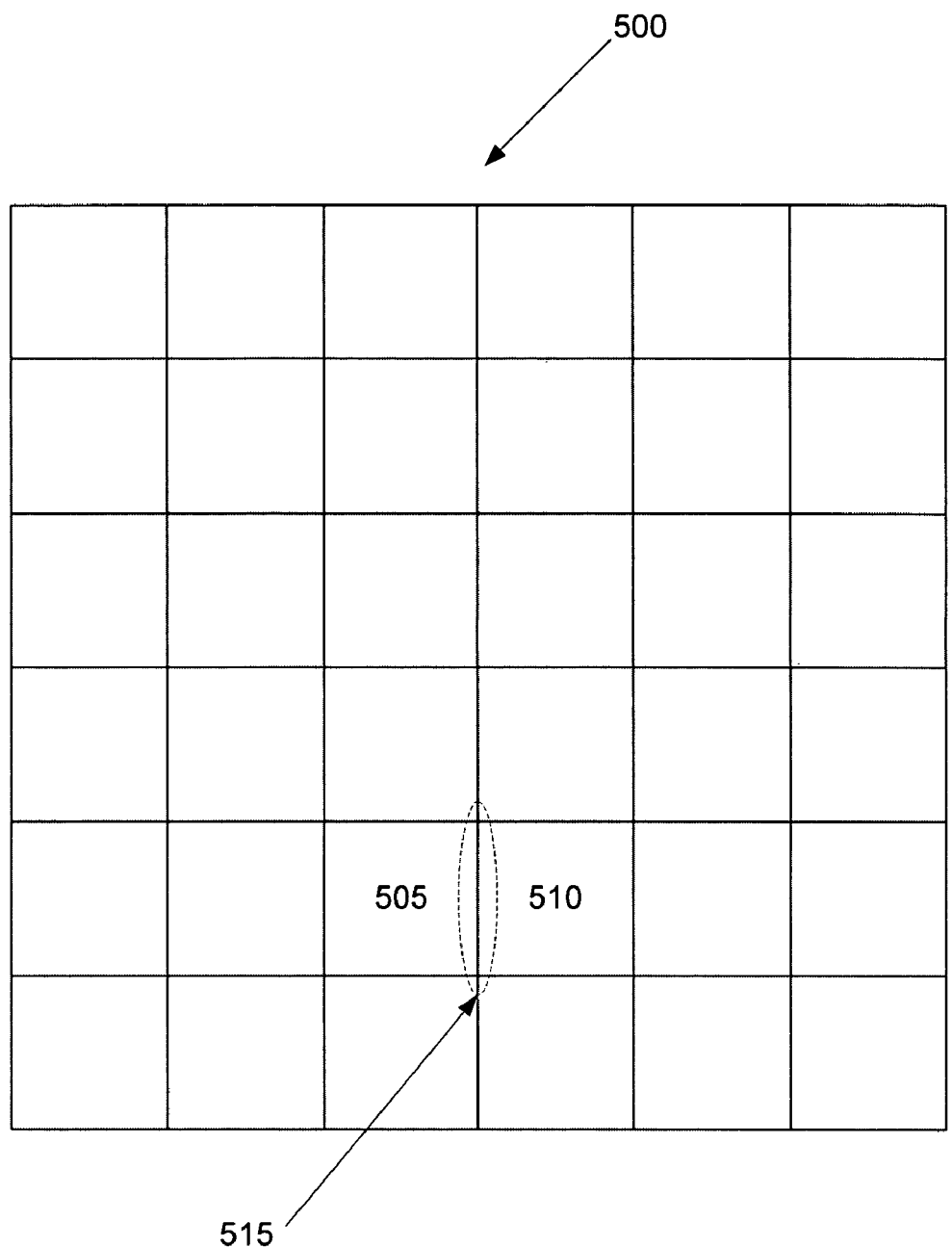
FIG. 5 conceptually illustrates a frame comprised of several macroblocks.

When encoding an image frame, there is typically some loss of information or distortion of the image. However, each block within the frame generally shows insignificant and usually not visible distortion of the image. Nevertheless, the transition between blocks (at borders of the blocks) can sometimes be seen because neighboring blocks of a frame are encoded and decoded separately. Thus, this results in the image appearing to be made of blocks. A deblocking/loop filter is used to reduce the appearance of such blocks by smoothing the border areas between neighboring blocks. FIG. 5 conceptually illustrates a frame 500 comprised of several macroblocks. As shown in this figure, the frame 500 is comprised of two neighboring macroblocks 505-510. These two macroblocks 505-510 share a common border area 515 where the image distortion described above can be seen.

Under the dependencies derived for the H.264 codec, the deblocking filter typically filters/processes each block sequentially in a specific order. This filtering order is specified by a particular dependency between the blocks, wherein a first block is considered dependent on a second block if filtering of the second block must be completed before filtering of the first block can begin.

Figure 6:
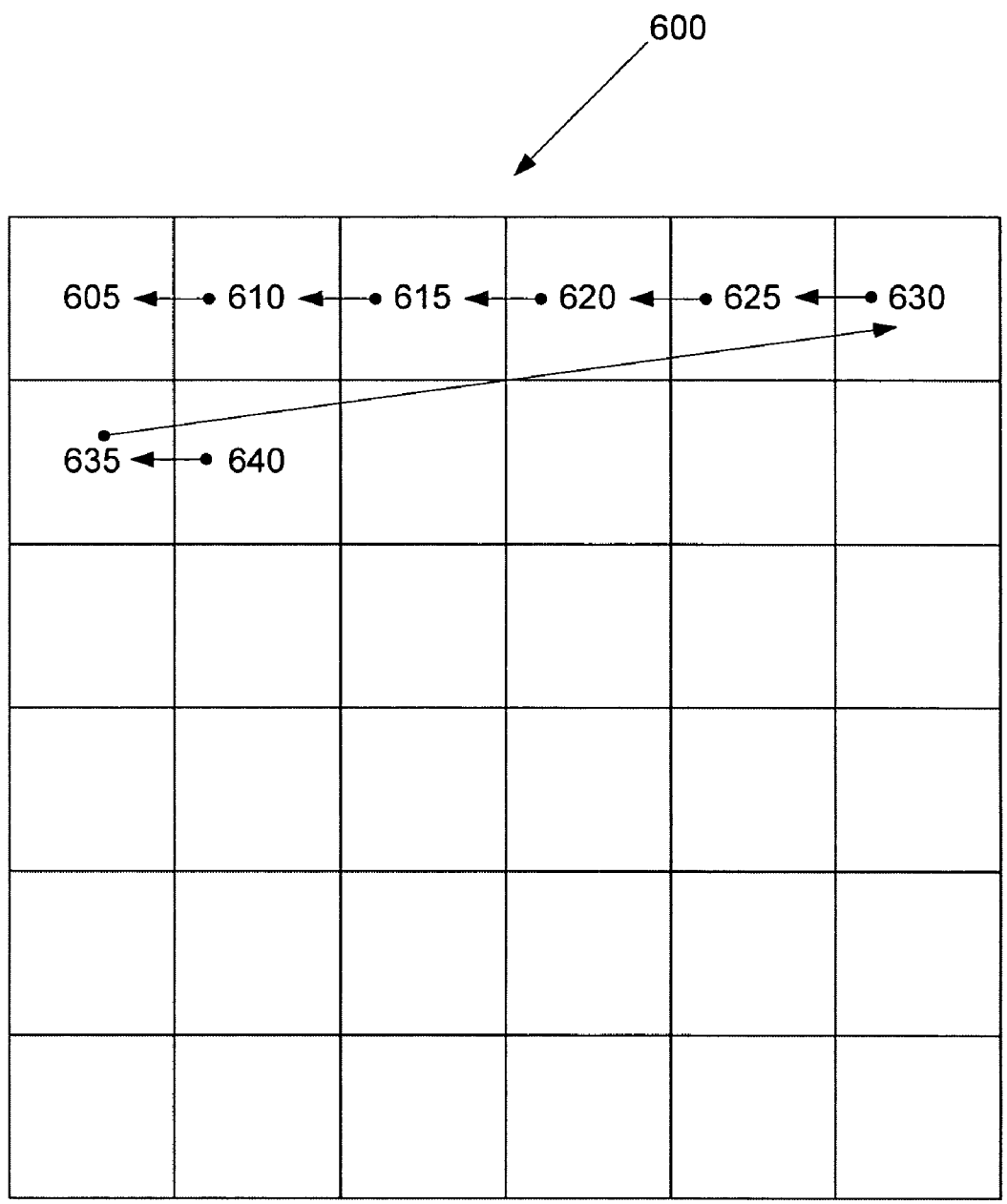
FIG. 6 conceptually illustrates examples of macroblock dependencies of a frame under the H.264 codec.

FIG. 6 conceptually illustrates examples of macroblock dependencies of a frame 600 under the H.264 codec. As shown in this figure, the H.264 codec requires that filtering of macroblock 605 must be completed first. Once filtering of macroblock 605 is completed, then filtering of macroblock 610 can begin (macroblock 610 is dependent on macroblock 605, as indicated by the arrow). Once filtering of macroblock 610 is completed, filtering of macroblock 615 can begin (macroblock 615 is dependent on macroblock 610, as indicated by the arrow) and so on (e.g., macroblock 620 is dependent on macroblock 615, macroblock 625 is dependent on macroblock 620, macroblock 630 is dependent on macroblock 625, macroblock 635 is dependent on macroblock 630, and macroblock 640 is dependent on macroblock 635). Also as shown in FIG. 6, the first macroblock on the second row (macroblock 635) is dependent on the last macroblock of the first row (macroblock 630). Therefore, as shown in this figure, a particular macroblock cannot be filtered until at least all the macroblocks to the left and on the same row and on all the above rows of that particular macroblock have been filtered.

B. Multithreaded Deblock Filtering

Figure 7:
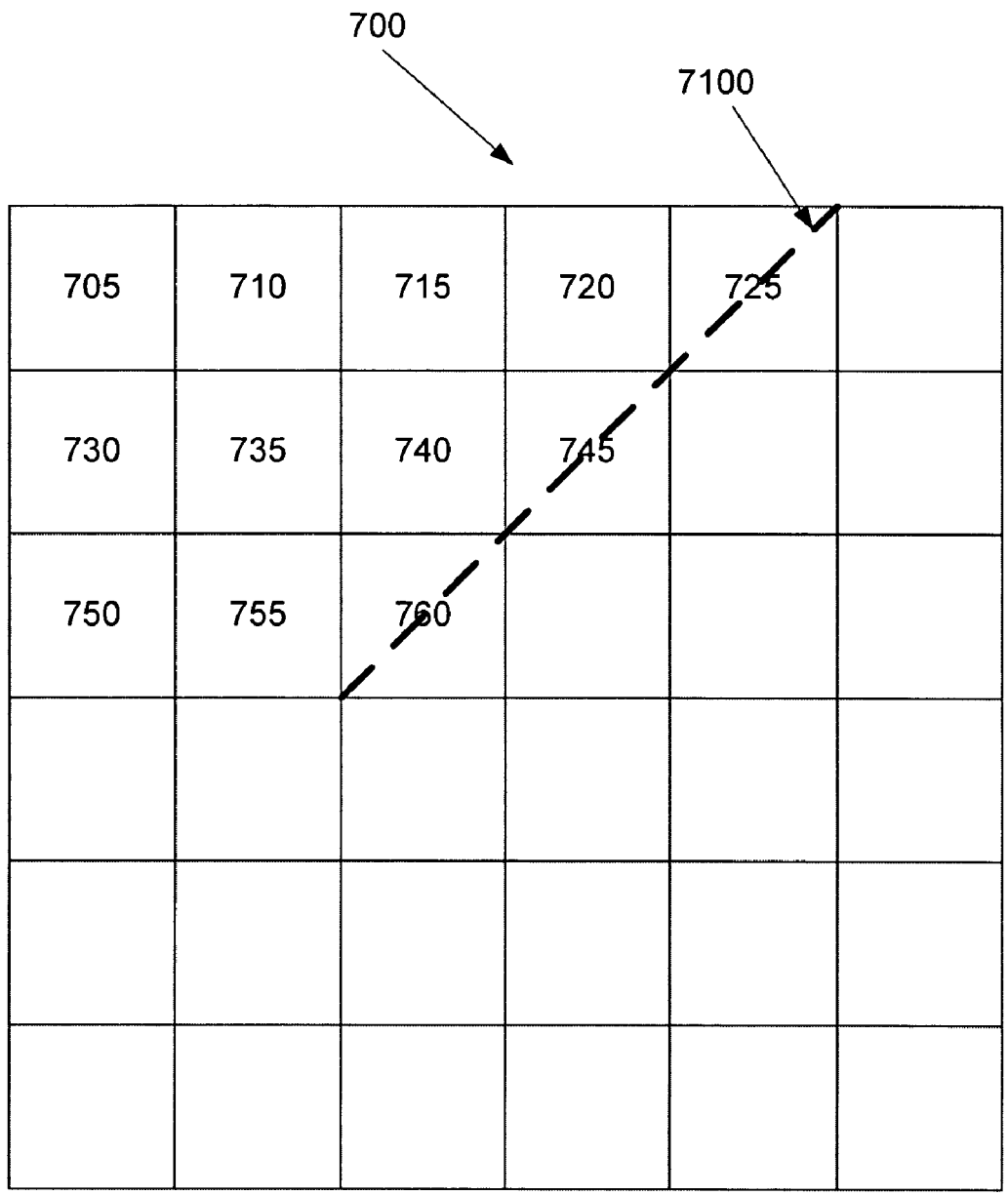
FIG. 7 conceptually illustrates the dependencies of the macroblocks of a frame as specified under the H.264 codec.

Upon further review of the H.264 codec specification, it becomes apparent that the dependencies are not as strict as they seem and can be manipulated in such a way as to allow multi-threaded filtering/processing of the frame. FIG. 7 conceptually illustrates the dependencies of the macroblocks of a frame 700 as specified under the H.264 codec. As shown in this figure, a given macroblock 760 of the frame 700 is dependent on all the macroblocks of the frame 700 that are on or to the left of a diagonal line 7100 that extends from the given macroblock 760 upwards and diagonally to the right of the given macroblock 760 (i.e., macroblocks 705-755 in the example shown in FIG. 7). The above described dependencies can be exploited to divide the frame into sections and sub-sections that can be filtered in parallel with more than one thread/CPU.

Figure 8:
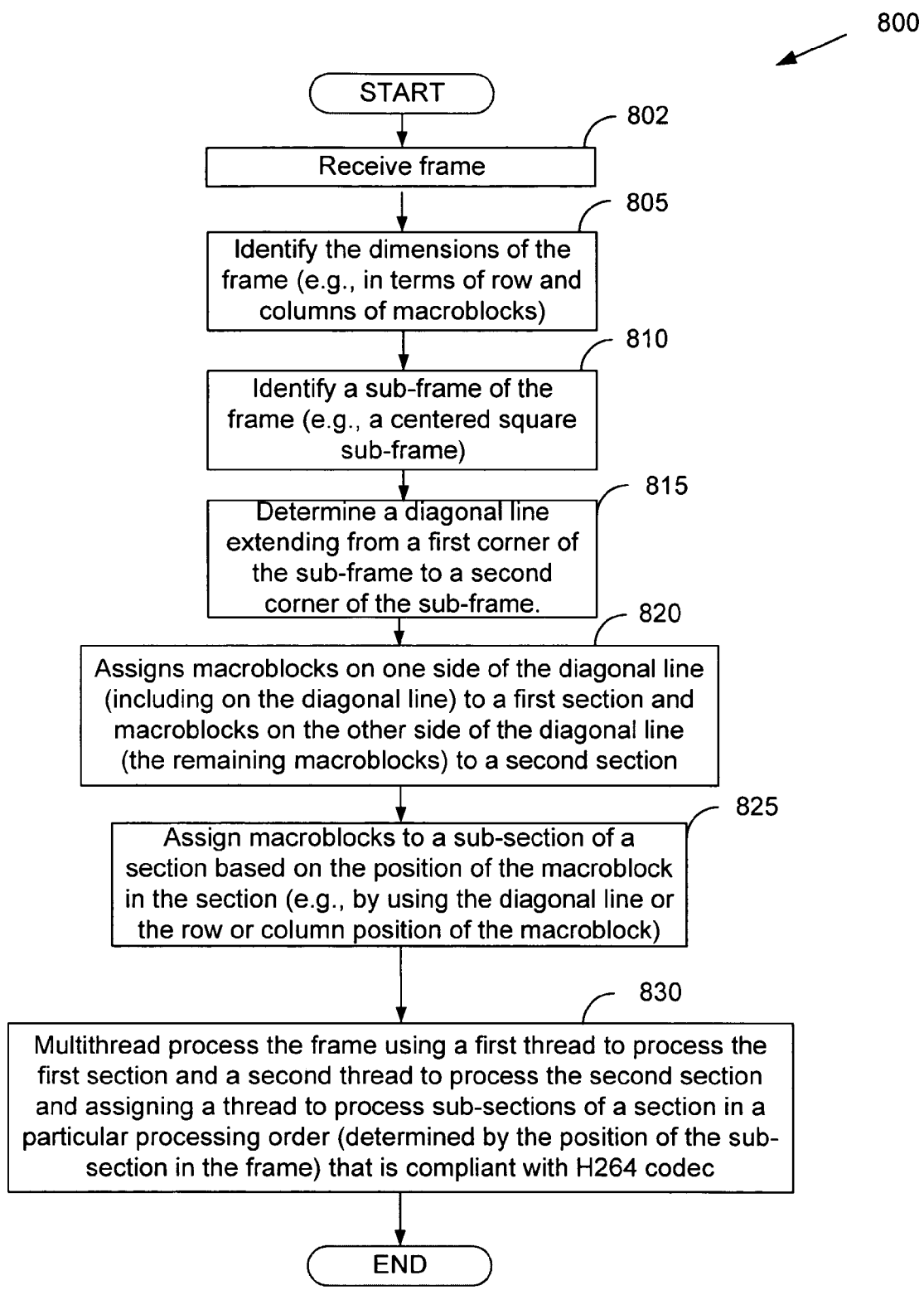
FIG. 8 is a flowchart of a method for multithread processing of a frame under the H.264 codec.
Figure 9:
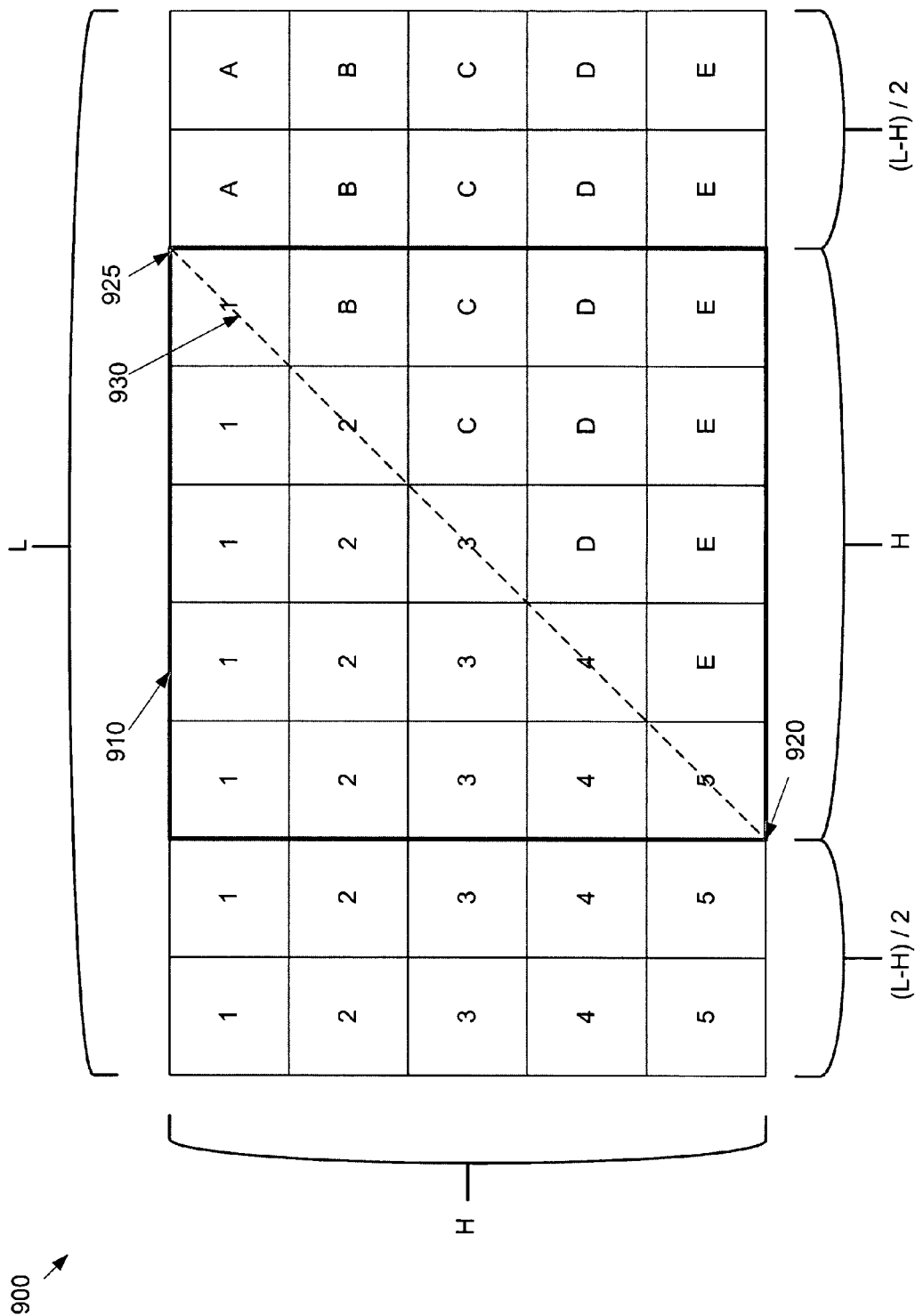
FIG. 9 illustrates a centered sub-frame identified in a landscape frame.
Figure 10:
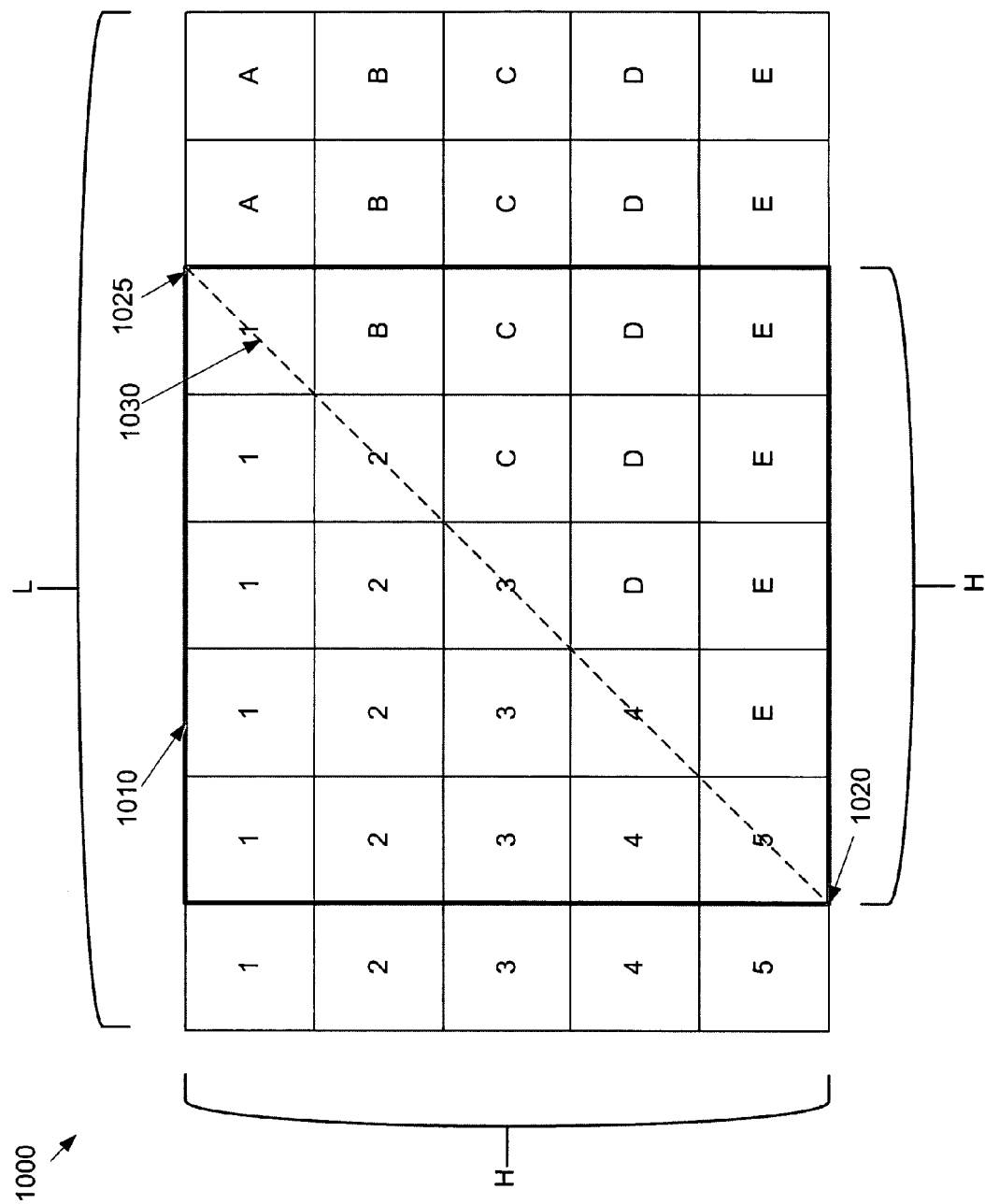
FIG. 10 illustrates a non-centered sub-frame identified in a landscape frame.

FIG. 8 is a flowchart of a method 800 for multithread filtering/processing of a frame under the H.264 codec. The method 800 can be used to allow multithreaded filtering during the decoding of the frame or to allow multithreaded filtering after decoding the frame. In some embodiments, the method 400 is implemented by software or hardware configured to decode video frames. The method 800 is described in relation to FIGS. 9, 10, and 11. FIGS. 9 and 10 illustrate landscape frames comprising sections and sub-sections, the landscape frames having a length that is greater than the height of the frames. For purposes of discussion, the method 800 is described in relation to the landscape frames of FIGS. 9 and 10. In other embodiments, however, the method is used to process portrait frames (frames having a height that is greater than the length of the frames), as discussed below in relation to FIGS. 12 and 13.

The method begins when it receives (at 802) a frame comprised of a plurality of macroblocks. In some embodiments, the frame has dimensions in terms of the number of columns and rows of macroblocks in the frame, each macroblock having a particular column and row position in the frame. The method 800 then identifies (at 805) the dimensions of the frame. In some embodiments, the length (L) of the frame 900 is the number of columns of macroblocks and the height (H) of the frame 900 is the number of rows of macroblocks (as illustrated in FIG. 9).

The method 800 identifies (at 810) a sub-frame 910 comprising some or all macroblocks of the frame. In some embodiments, the sub-frame 910 is a square sub-frame centered in the frame. In some embodiments, a centered sub-frame has an equal number of macroblocks in the frame that are outside the sub-frame on both the left and right sides of the sub-frame and an equal number of macroblocks in the frame that are outside the sub-frame on both the top and bottom sides of the sub-frame. In some embodiments, at least one of the dimensions of the sub-frame is equal to the corresponding dimension of the frame (i.e., either the length of the sub-frame is equal to the length of the frame and/or the height of the sub-frame is equal to the height of the frame).

FIG. 9 shows an example of a centered square sub-frame 910 having dimensions of H×H that is identified by taking off a particular number of columns (e.g., (L−H)/2) from each side of the frame 900. In other embodiments, the sub-frame 910 has other dimensions. For example, the sub-frame 910 may have dimensions of L×L that is identified by taking off a particular number of rows (e.g., (H−L)/2) from the top and bottom of the frame 900 (as discussed below in relation to FIGS. 12 and 13).

In the steps described below, the method 800 then assigns each macroblock of the frame to a particular section of the frame and also to a particular sub-section of the assigned section for multithread processing purposes. Conceptually, the frame is divided into two types of sections, each section comprising one or more sub-sections, each sub-section comprising one or more macroblocks of the frame. The first section of the frame is to be processed by a first thread/CPU and the second section of the frame is to be processed by a second thread/CPU.

Each sub-section of a section has a particular associated processing order in relation to the other sub-sections of the same section that determines the order in which sub-sections of a section are later assigned to a thread/CPU for processing. For example, first, second, and third sub-sections of a section may have associated processing orders such that the first sub-section of a section will be assigned to a thread/CPU for processing before the second sub-section and the second sub-section of a section will be assigned to the thread/CPU for processing before the third sub-section. As such, the section to which a macroblock is assigned determines which thread/CPU processes the macroblock and the sub-section to which a macroblock is assigned determines the processing order of the macroblock in relation to macroblocks assigned to other sub-sections of the same section.

For example, as shown in FIG. 9, the frame may be divided into numbered and lettered sections, the numbered section comprising all macroblocks labeled with a number and the lettered section comprising all macroblocks labeled with a letter. The numbered section is to be processed by a first thread/CPU and the lettered section of the frame is to be processed by a second thread/CPU. The numbered section comprises a first sub-section (comprising all macroblocks labeled 1), a second sub-section (comprising all macroblocks labeled 2), etc. The lettered section comprises a first sub-section (comprising all macroblocks labeled A), a second sub-section (comprising all macroblocks labeled B), etc. As used herein, the term "sub-section labeled X" refers to a sub-section comprising macroblocks labeled X.

The sub-sections of the first section have associated processing orders, for example, such that the sub-section labeled 1 will be assigned to the first thread/CPU for processing before the sub-section labeled 2, the sub-section labeled 2 will be assigned to the first thread/CPU for processing before the sub-section labeled 3, etc. The sub-sections of the second section also have associated processing orders, for example, such that the sub-section labeled A will be assigned to the second thread/CPU for processing before the sub-section labeled B, the sub-section labeled B will be assigned to the second thread/CPU for processing before the sub-section labeled C, etc.

To assign each macroblock of frame to a particular section of the frame, the method 800 first determines (at 815) a diagonal line extending from a first corner of the sub-frame to a second corner of the sub-frame, the first and second corners being positioned diagonally across each other on the sub-frame. In the example shown in FIG. 9, a diagonal line 930 is shown to extend diagonally from a first corner 920 of the sub-frame to a second corner 925 of the sub-frame 910.

The method then assigns all macroblocks of the frame to a section of the frame and a sub-section of the assigned section based on the diagonal line. In particular, the method then assigns (at 820) all macroblocks of the frame on a first side of the diagonal line (including macroblocks on the diagonal line) to a first section of the frame and assigns all macroblocks on the second side of the diagonal line (excluding macroblocks on the diagonal line), i.e., all remaining macroblocks of the frame not in the first section, to a second section of the frame. The method may do so, for example, by determining all macroblocks on the first side of the diagonal line (including macroblocks on the diagonal line) and assigning all such macroblocks to the first section, and similarly, determining all macroblocks on the second side of the diagonal line (excluding macroblocks on the diagonal line) and assigning all such macroblocks to the second section. Alternatively, the method may do so, for example, by assigning each macroblock individually by determining the position of each macroblock relative to the diagonal line and assigning the macroblock to the first or second section accordingly.

Step 820 is illustrated in the example of FIG. 9 where macroblocks on the left side of the diagonal line 930 (including macroblocks on the diagonal line) are assigned to a numbered section of the frame (as illustrated by the numbered macroblocks) and macroblocks on the right side of the diagonal line 930 (excluding macroblocks on the diagonal line) are assigned to a lettered section of the frame (as illustrated by the lettered macroblocks).

For each section of the frame, the method 800 then assigns (at 825) each macroblock of the section to a sub-section of the section based on the position of the macroblock in the section. The method may do so, for example, by assigning all macroblocks in a first row of the section to a first sub-section of the section, all macroblocks in a second row of the section to a second sub-section of the section, etc. Alternatively, the method may do so, for example, by assigning each macroblock to a sub-section individually by determining the row position of the macroblock and assigning the macroblock to a sub-section accordingly. As such, the sub-sections of each section are determined based on the position of the sub-section in the section. To be compliant with the H.264 codec specifications, a sub-section having a higher row position (towards the top of the frame) than another sub-section has an associated processing order that is prior to the other sub-section (e.g., sub-section 1 will have an earlier associated processing order than sub-section 2 since it has a higher row position in the frame).

Step 825 is illustrated in the example of FIG. 9 where macroblocks on the first row of the numbered section are assigned to sub-section 1 (as illustrated by the macroblocks labeled 1), macroblocks on the second row of the numbered section are assigned to sub-section 2 (as illustrated by the macroblocks labeled 2), etc. Also illustrated in the example of FIG. 9 are macroblocks on the first row of the lettered section assigned to sub-section A (as illustrated by the macroblocks labeled A), macroblocks on the second row of the numbered section are assigned to sub-section B (as illustrated by the macroblocks labeled B), etc.

In a further embodiment, for each section of the frame, the method 800 assigns (at 825) each macroblock of the section to a sub-section of the section based on a predetermined equation. In some embodiments, for each row of a section, starting from the left column, the first N macroblocks of the row are assigned to a sub-section corresponding to the row number of the row, where N can be determined with the following equation:

$$N = \frac{(L-H)}{2} + H - (R-1)$$

where L is the length of the frame in macroblocks, H is the height of the frame in macroblocks, and R is the row number of the row.

Once the first N macroblocks have been assigned a sub-section, the remaining macroblocks on that row are then assigned to a corresponding sub-section in the other section. As shown in the example of FIG. 9, the first 7 macroblocks of row 1 are assigned to a first sub-section (labeled 1) of the numbered section while the remaining 2 macroblocks of row 1 are assigned to a first sub-section (labeled A) of the lettered section. The first 6 macroblocks of row 2 are assigned to a second sub-section (labeled 2) of the numbered section while the remaining 3 macroblocks of row 2 are assigned to a second sub-section (labeled B) of the lettered section.

Alternatively, the method may combine steps 820 and 825 by directly assigning macroblocks to sub-sections based on the diagonal line (determined at 815) and the row of the frame in which the macroblock is located. For example, the method may assign all macroblocks on the first row of the frame that are on a first side of the diagonal line (including the macroblock on the diagonal line) to a first sub-section of a first section of the frame and assign all macroblocks on the first row of the frame that are on the second side of the diagonal line (excluding the macroblock on the diagonal line) to a first sub-section of a second section of the frame, assign all macroblocks on the second row that are on the first side of the diagonal line (including the macroblock on the diagonal line) to the second sub-section of the first section and assign all macroblocks on the second row on the second side of the diagonal line (excluding the macroblock on the diagonal line) to a second sub-section of the second section of the frame, etc.

In some embodiments, it is not possible to identify a centered sub-frame in the frame that is processed/filtered. In these embodiments, a non-centered sub-frame (i.e., a sub-frame not having an equal number of macroblocks outside both the left and right sides of the sub-frame and an equal number of macroblocks outside both the top and bottom sides of the sub-frame) in the frame is identified. FIG. 10 illustrates a non-centered sub-frame 1010 identified in a frame 1000. Thus, as shown in this figure, macroblocks of the frame 1000 can still be divided into sections and sub-sections (similarly to frame 900 of FIG. 9), in accordance with some embodiments, that allows for the multithread filtering/processing of the frame 1000. In the example shown in FIG. 10, a diagonal line 1030 is identified that extends diagonally from a first corner 1020 of the sub-frame to a second corner 1025 of the sub-frame 1010.

The method 800 is described in relation to the frame 900 of FIG. 9, although, in other embodiments, the method 800 is used for frames having other dimensions. Also, in the embodiments described above, the method 800 divides the frame into numbered and lettered sections. However, other embodiments may use other identifiers in assigning macroblocks to sections and sub-sections of the frame.

After the method 800 assigns (at 825) each macroblock of the frame to a sub-section, the method then processes/filters (830) the frame using at least two threads/CPUs in parallel, wherein the first section (e.g., numbered section) is processed by a first thread/CPU and the second section (e.g., lettered section) is processed by a second thread/CPU. The method 800 does so by assigning a thread/CPU to process sub-sections of a section in a particular processing order associated with the sub-section (that is determined by the position of the sub-section in the frame) that is compliant with the H.264 codec specifications. As discussed above, each sub-section of a section has a particular associated processing order in relation to the other sub-sections of the same section that determines the order in which sub-sections of a section are later assigned to a thread/CPU for processing.

Each sub-section in the same section is assigned for processing/filtering one sub-section at a time so that processing/filtering of all macroblocks of a sub-section must be completed by the thread/CPU before the thread/CPU can start processing/filtering macroblocks of another sub-section. During multithread processing of the frame, a sub-section may be dependent on one or more other sub-sections in the same section or another section (as discussed below), wherein a first sub-section is considered dependent on a second sub-section if filtering of all the macroblocks of the second sub-section must be completed before filtering of any of the macroblocks of the first sub-section can begin. After the method 800 multithread processes/filters (830) the frame, the method ends.

FIG. 11 conceptually illustrates a timing diagram of the multithread processing/filtering of the frame 900 of FIG. 9. For illustrative purposes, the timing diagram of FIG. 11 assumes each macroblock is filtered in 1 time unit. In practice, however, processing variations will cause processing of macroblocks to finish at various times. As shown in this figure, a first thread/CPU filters the macroblocks of a numbered section of the frame (having sub-sections labeled 1, 2, 3, etc.) and a second thread/CPU filters the macroblocks of a lettered section of the frame (having sub-sections labeled A, B, C, etc.). The first thread/CPU filters the sub-sections of the numbered section one sub-section at a time, starting from sub-section 1, then sub-section 2, then sub-section 3, etc. The second thread/CPU filters the sub-sections of the lettered section one sub-section at a time, starting from sub-section A, then sub-section B, then sub-section C, etc. Typically, the threads/CPUs filter macroblocks of a sub-section from left to right in the sub-section.

During multithread processing of the frame 900, there are particular sub-section dependencies required under the H.264 codec. For the numbered section, the nth sub-section depends on the (n−1)th sub-section of the numbered section (i.e., sub-section 1 depends on no other sub-sections, sub-section 2 depends on sub-section 1, sub-section 3 depends on sub-section 2, etc.). For the lettered section, assume that the letter label of a sub-section corresponds to the position (i.e., n value) of the letter in the alphabet (i.e., A corresponds to 1, B corresponds to 2, C corresponds to 3, etc.). Assuming this for the lettered section, the nth sub-section depends on the (n−1)th sub-section of the lettered section and the nth sub-section of the numbered section (i.e., sub-section A depends on sub-section 1, sub-section B depends on sub-section A and sub-section 2, sub-section C depends on sub-section B and sub-section 3, sub-section D depends on sub-section C and sub-section 4, and sub-section E depends on sub-section D and sub-section 5).

If a sub-section is dependent on another sub-section(s), completion of processing of the other sub-section(s) triggers assignment of the sub-section to a thread/CPU for processing. For example, completion of processing of sub-section 1 triggers assignment of sub-section 2 to the first thread/CPU for processing and triggers assignment of sub-section A to the second thread/CPU for processing.

Note that the second thread/CPU needs to wait on the processing results of the first thread/CPU. As such, the second thread/CPU experiences idle time (indicated by the symbol *) when it waits on the first thread/CPU to finish the processing/filtering of particular sub-sections (depending on the dependency relationships described above). In addition, towards the end of the multithreading filtering operation, the first thread/CPU also experiences idle time (indicated by the symbol *) since it has filtered all macroblocks assigned to it and is now waiting for the second thread/CPU to finish filtering the macroblocks assigned to it. Although the threads/CPUs experience some idle time, multithread filtering of the frame will still be faster than sequential filter filtering of the frame. In the embodiments described below, during the time of a thread/CPU that would normally be spent being idle, the thread/CPU is used to process macroblocks in an associated frame.

Figure 12:
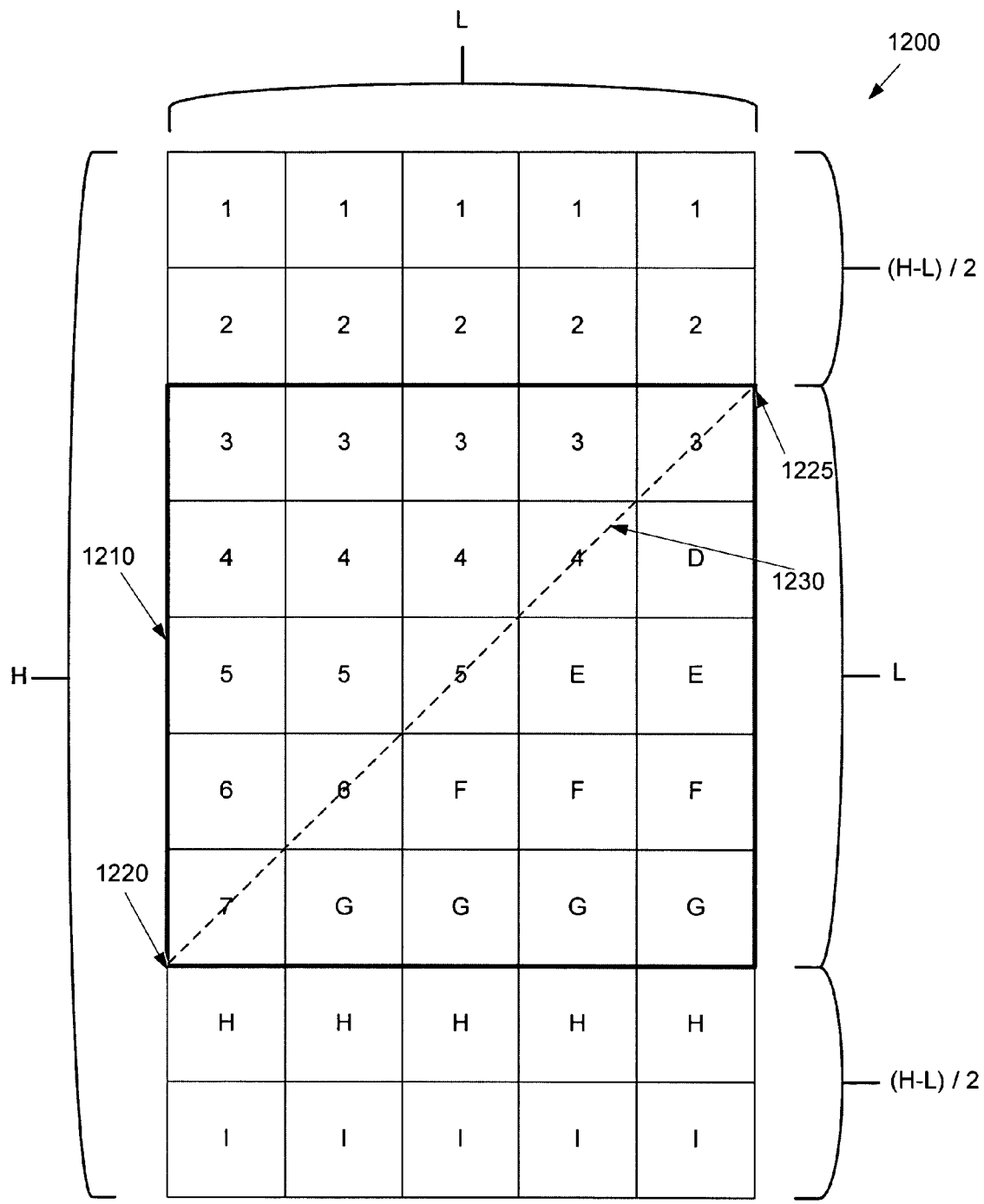
FIG. 12 illustrates a centered sub-frame identified in a portrait frame.

In the embodiments described above, it is assumed that the length (L) of the frame is greater than or equal to the height (H) of the frame. However, in some instances, the height (H) of the frame may be greater than the length (L) of the frame (i.e., the frame may be a portrait frame). FIG. 12 illustrates a centered sub-frame 1210 identified in a portrait frame 1200, the centered sub-frame 1210 having dimensions of L×L that is identified by taking off a particular number of rows (e.g., (H−L)/2) from top and bottom rows of the frame 1200. The sub-frame 1210 contains an identified diagonal line 1230 extending from a first corner 1220 of the sub-frame 1210 to a second corner 1225 of the sub-frame 1210, the first and second corners being positioned diagonally across each other on the sub-frame.

As shown in FIG. 12, macroblocks on the left side of the diagonal line 1230 (including macroblocks on the diagonal line) are assigned to a numbered section of the frame (as illustrated by the numbered macroblocks) and macroblocks on the right side of the diagonal line 1230 (excluding macroblocks on the diagonal line) are assigned to a lettered section of the frame (as illustrated by the lettered macroblocks). For each section of the frame, each macroblock of the section is included in a sub-section based on the row position of the macroblock. To be compliant with the H.264 codec specifications, a sub-section having a higher row position (towards the top of the frame) than another sub-section has an associated processing order that is prior to the other sub-section (e.g., sub-section 1 will have an earlier associated processing order than sub-section 2 since it has a higher row position in the frame).

The first section (numbered section) of the frame 1200 is then processed by a first thread/CPU and the second section (lettered section) of the frame is then processed by a second thread/CPU. The sub-sections of the first section have associated processing orders so that sub-section labeled 1 will be assigned to the first thread/CPU for processing before the sub-section labeled 2, the sub-section labeled 2 will be assigned to the first thread/CPU for processing before the sub-section labeled 3, etc. The sub-sections of the second section also have associated processing orders, for example, such that the sub-section labeled D will be assigned to the second thread/CPU for processing before the sub-section labeled E, the sub-section labeled E will be assigned to the second thread/CPU for processing before the sub-section labeled F, etc.

During multithread processing of the frame 1200, there are particular sub-section dependencies required under the H.264 codec. As discussed above, for the numbered section, the nth sub-section depends on the (n−1)th sub-section of the numbered section. For the lettered section, the nth sub-section depends on the (n−1)th sub-section of the lettered section and the nth sub-section of the numbered section. Note that the labeling of the lettered sub-sections in FIG. 12 has skipped A, B, and C and begins with D so that the above characteristic still holds true. As such, sub-section D depends on sub-section 4, sub-section E depends on sub-section D and sub-section 5, sub-section F depends on sub-section E and sub-section 6, etc.

Figure 13:
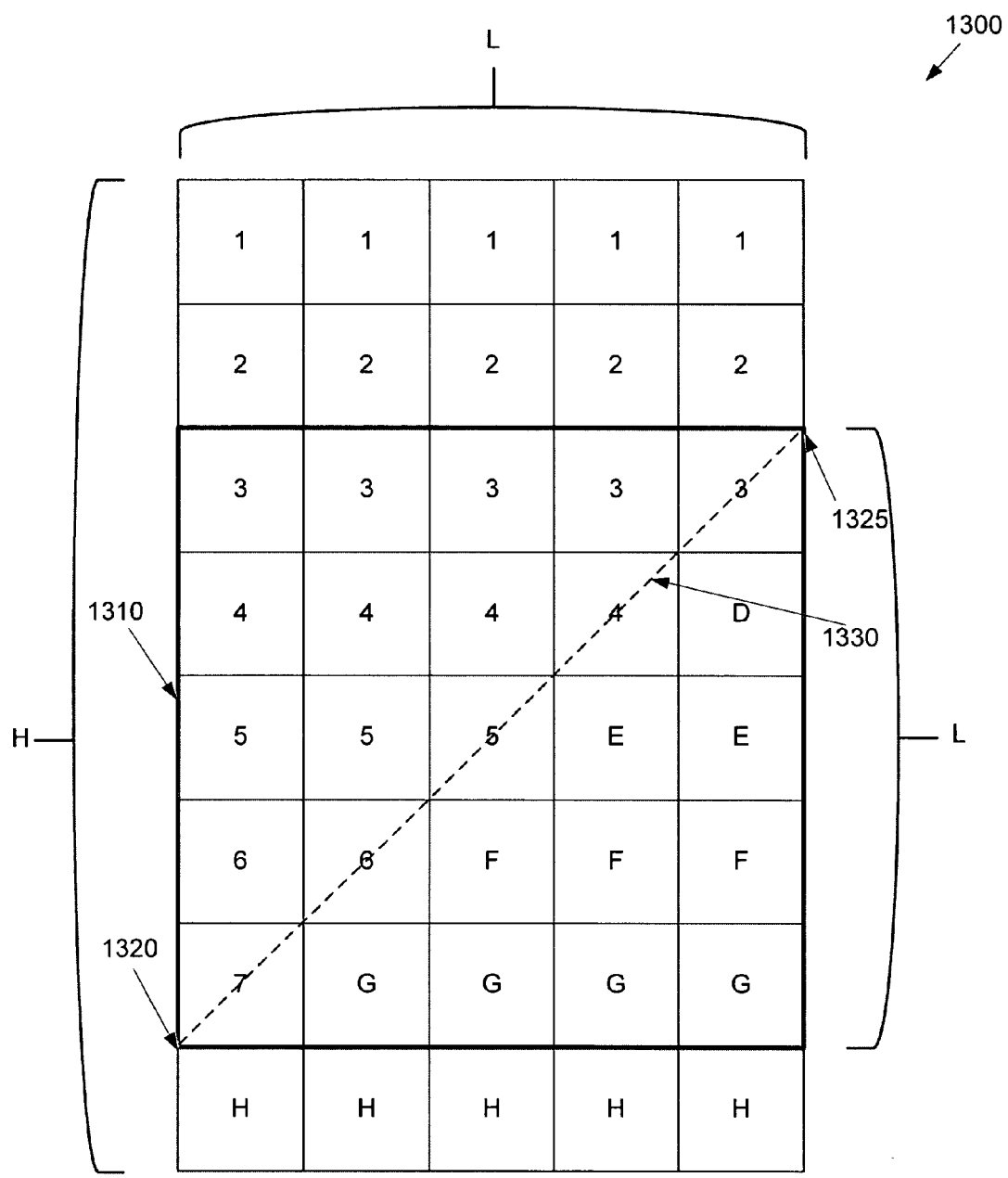
FIG. 13 illustrates a non-centered sub-frame identified in a portrait frame.

In some embodiments, it is not possible to identify a centered sub-frame in the portrait frame that is processed/filtered. In these embodiments, a non-centered sub-frame in the portrait frame is identified. FIG. 13 illustrates a non-centered sub-frame 1310 identified in a portrait frame 1300. Thus, as shown in this figure, macroblocks of the frame 1300 can still be divided into sections and sub-sections (similarly to frame 1200 of FIG. 12), in accordance with some embodiments, that allows for the multithread filtering/processing of the frame 1300. In the example shown in FIG. 13, a diagonal line 1330 is identified that extends diagonally from a first corner 1320 of the sub-frame to a second corner 1325 of the sub-frame 1310.

C. Color Frames

In some embodiments, the frame comprises a luma frame comprising macroblocks containing luma (brightness) information. Typically, a luma frame is the same size as the image frame. In color image frames, the luma frame also has two associated chroma frames comprising macroblocks containing chroma (color) information. Typically chroma frames are smaller than a luma frame (i.e., comprise fewer macroblocks than a luma frame) and are processed/filtered independently from the luma frame.

Figure 14:
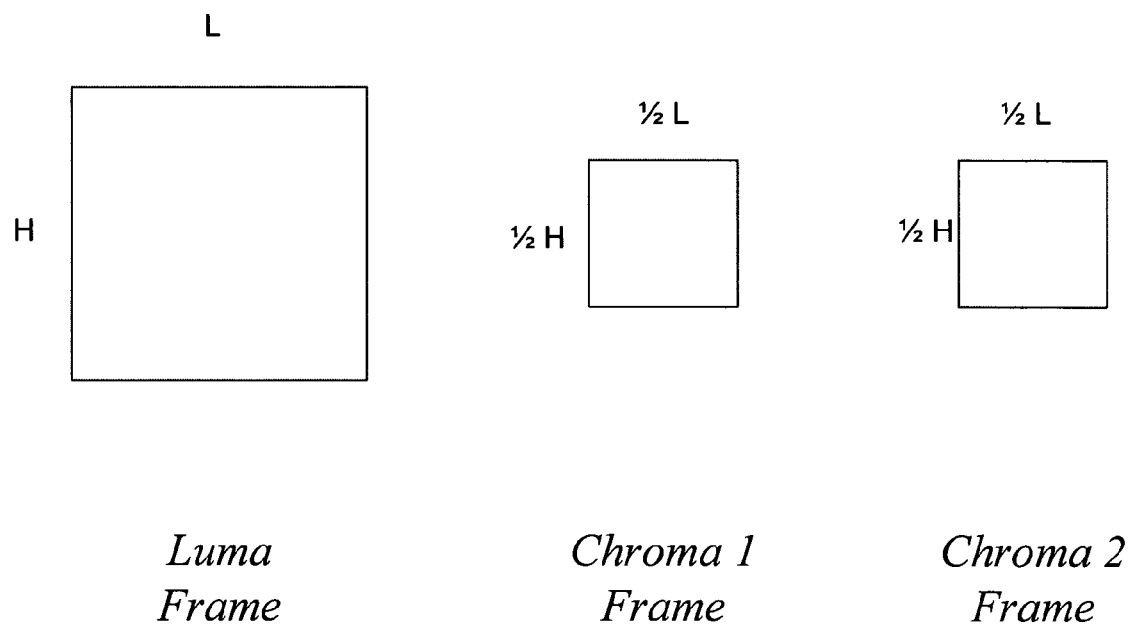
FIG. 14 conceptually illustrates an example of two chroma frames that are associated with a luma frame.

FIG. 14 conceptually illustrates an example of two chroma frames that are associated with a luma frame. As shown in this example figure, each chroma frame has a length that is half the length of the luma frame and a height that is half the height of the luma frame. As such, each chroma frame is ¼ the size and contains ¼ the number of macroblocks of the luma frame. Thus, for each color image frame, the deblocking filter has to filter three separate frames (i.e., luma, chroma 1, and chroma 2 frames).

In some embodiments, the luma and chroma frames are filtered in parallel using multithreading. In some embodiments, macroblocks of the chroma frames are processed during a thread's potential idle time during multithread processing of a luma frame (as indicated by the symbol * in FIG. 11). For instance, as discussed above, the second thread/CPU experiences idle time before processing it's first sub-section (labeled A) since it must wait for the first thread/CPU to process it's first sub-section (labeled 1). In some embodiments, during this potential idle time, the second thread/CPU is assigned to process macroblocks of the first chroma frame. Also, towards the end of the multithreading filtering operation, the first thread/CPU also experiences idle time as it waits for the second thread/CPU to finish filtering the macroblocks assigned to it. In some embodiments, during this potential idle time, the first thread/CPU is assigned to process macroblocks of the second chroma frame. Other embodiments might use other combinations of parallel filtering.

Figure 15:
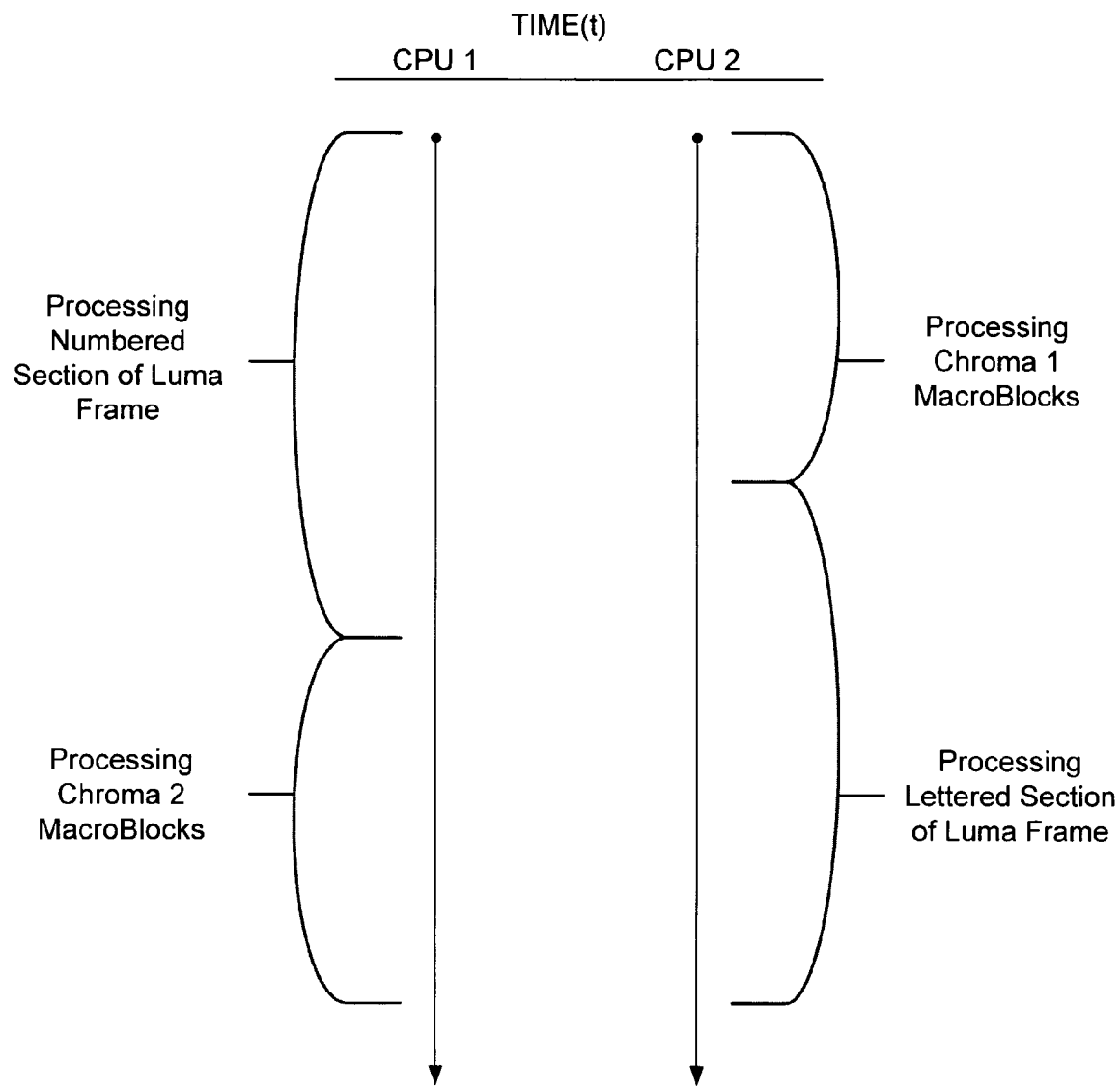
FIG. 15 conceptually illustrates an exemplary timing diagram of the multithread processing/filtering of luma and chroma frames.

FIG. 15 conceptually illustrates an exemplary timing diagram of the multithread processing/filtering of luma and chroma frames. As shown in this figure, the second thread/CPU is assigned to process macroblocks of the first chroma frame before processing macroblocks of the lettered section of the luma frame. Also, the first thread/CPU is assigned to process macroblocks of the second chroma frame after processing macroblocks of the numbered section of the luma frame. The processing times shown in this figure are for illustrative purposes only and may differ significantly in practice.

Some embodiments perform the filtering operation during the decoding operation, while other embodiments perform the filtering after the decoding operation. The advantage of performing the filtering operation during the decoding operation is that the filtering operation has access to information that is obtained by the decoder during the decoding operation.

Figure 16:
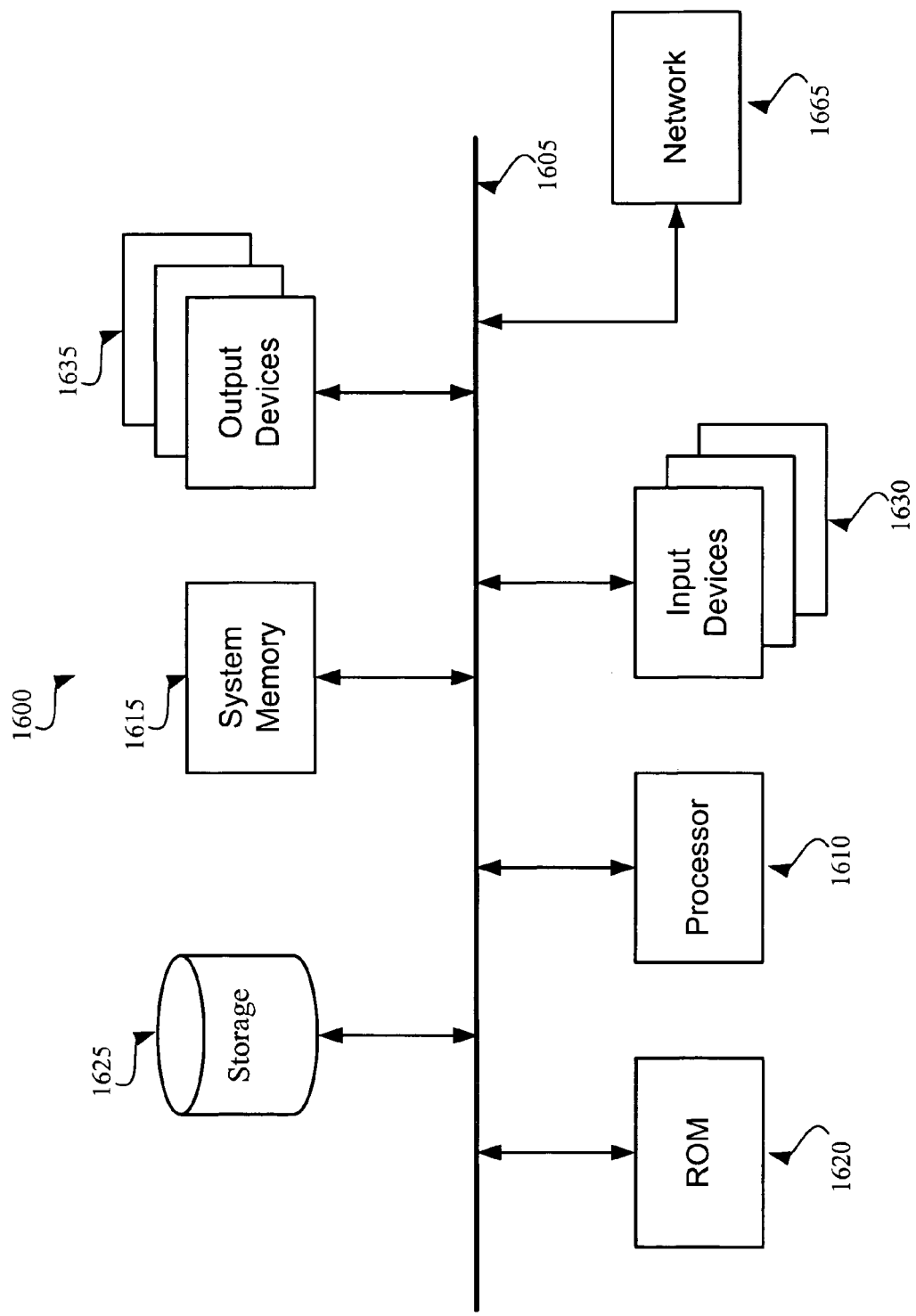
FIG. 16 presents a computer system with which some embodiments of the invention are implemented.

FIG. 16 presents a computer system 1600 with which some embodiments are implemented. The computer system 1600 includes a bus 1605, a processor 1610, a system memory 1615, a read-only memory 1620, a permanent storage device 1625, input devices 1630, and output devices 1635.

The bus 1605 collectively represents all system, peripheral, and chipset buses that communicatively connect the numerous internal devices of the computer system 1600. For instance, the bus 1605 communicatively connects the processor 1610 with the read-only memory 1620, the system memory 1615, and the permanent storage device 1625.

The read-only-memory (ROM) 1620 stores static data and instructions that are needed by the processor 1610 and other modules of the computer system. The permanent storage device 1625, on the other hand, is read-and-write memory device. This device is a non-volatile memory unit that stores instruction and data even when the computer system 1600 is off. Some embodiments use a mass-storage device (such as a magnetic or optical disk and its corresponding disk drive) as the permanent storage device 1625. Other embodiments use a removable storage device (such as a floppy disk or Zip® disk, and its corresponding disk drive) as the permanent storage device.

Like the permanent storage device 1625, the system memory 1615 is a read-and-write memory device. However, unlike storage device 1625, the system memory is a volatile read-and-write memory, such as a random access memory (RAM). The system memory stores some of the instructions and data that the processor needs at runtime.

Instructions and/or data needed to perform some embodiments are stored in the system memory 1615, the permanent storage device 1625, the read-only memory 1620, or any combination of the three. For example, the various memory units may contain instructions for encoding, decoding, or deblocking video data streams in accordance with some embodiments and/or contain video data. From these various memory units, the processor 1610 retrieves instructions to execute and data to process in order to execute the processes of some embodiments. From these various memory units, the processor 1610 retrieves instructions to execute and data to process in order to execute the processes of some embodiments.

The bus 1605 also connects to the input and output devices 1630 and 1635. The input devices 1630 enable a user to communicate information and select commands to the computer system 1600. The input devices 1630 include alphanumeric keyboards and cursor-controllers. The output devices 1635 display images generated by the computer system 1600. The output devices include printers and display devices, such as cathode ray tubes (CRT) or liquid crystal displays (LCD).

Finally, as shown in FIG. 16, the bus 1605 also couples the computer system 1600 to a network 1665 through, for example, a network adapter (not shown). In this manner, the computer system 1600 can be a part of a network of computers (such as a local area network ("LAN"), a wide area network ("WAN"), or an Intranet) or a network of networks (such as the Internet). Any or all of the components of the computer system 1600 may be used in conjunction with some embodiments. However, one of ordinary skill in the art would appreciate that any other system configuration may also be used in conjunction with other embodiments.

While the invention has been described with reference to numerous specific details, one of ordinary skill in the art will recognize that the invention can be embodied in other specific forms without departing from the spirit of the invention. For instance, many embodiments of the invention were described above by reference to macroblocks. One of ordinary skill will realize that these embodiments can be used in conjunction with any other array of pixel values.

I claim:

1. A method for encoding a video picture, the method comprising:
    determining first and second size categories by setting a first number of slices for the first size category and setting a second number of slices for the second size category, wherein the first number of slices is equal to a number of parallel task threads available to encode slices of the video picture and the second number of slices is based on a total number of slices for the video picture and the first number of slices;
    dividing the video picture into a plurality of different sized slices that are categorized into the first and second size categories, wherein at least one slice belongs to each of the first and second categories, wherein each of the slice sizes is specified as a number of macroblocks in the slice; and
    at an encoder, encoding the video picture by starting encoding of all slices in the first size category before starting encoding of any slice in the second size category.

2. The method of claim 1, wherein a ratio between the slice sizes of the first and second categories is larger than a minimum ratio.

3. The method of claim 1, wherein two or more slices of a same size category are different in size.

4. The method of claim 1, wherein all slices in the first size category are larger in size than all slices in the second size category.

5. The method of claim 4 further comprising determining a slice size of the first category and a slice size of the second category such that the percentage of the video picture that is to be encoded as slices in the first category is larger than a minimum percentage.

6. The method of claim 4, wherein the second number of slices is equal to the total number of slices for the video picture minus the first number of slices.

7. The method of claim 4, wherein the first size category comprises slices that are configured to be decoded before the slices in the second size category.

8. A non-transitory computer readable medium storing a computer program for execution by at least one processing unit, the computer program for encoding a video frame, the computer program comprising sets of instructions for:
    identifying a plurality of size categories that specify different video frame slice sizes, wherein at least one size category specifies two or more different slice sizes;
    setting a number of slices in a first size category equal to a number of parallel task threads available to encode slices of the video frame;
    setting a number of slices in a second size category based on a total number of slices for the video frame and the number of slices in the first size category; and
    encoding the video frame by (i) using the identified different size categories to divide the video frame into a plurality of different sized slices and (ii) starting encoding of all slices in one size category before starting encoding of any slice in any other size category, wherein at least one slice belongs to each of the first and second categories, wherein each of the slice sizes is specified as a number of macroblocks in the slice.

9. The computer readable medium of claim 8, wherein all slices in the first size category are larger in size than all slices in the second size category.

10. The computer readable medium of claim 8, wherein a ratio between the slice sizes of the first and second size categories is larger than a minimum ratio.

11. The computer readable medium of claim 9, wherein the set of instructions for identifying the plurality of size categories comprises a set of instructions for determining a slice size of the first size category and a slice size of the second size category such that a percentage of the video frame that is to be encoded as slices in the first size category is larger than a minimum percentage.

12. The computer readable medium of claim 9, wherein the computer program further comprises sets of instructions for:
    setting the number of slices in the second size category to equal the total number of slices for the video frame minus the number of slices in the first size category.

13. A method for decoding a video frame, the method comprising:
    determining first and second size categories by setting a number of slices in the first size category equal to a number of available parallel task threads to decode slices of the video frame and setting a number of slices in the second size category based on a total number of slices in the video frame and the number of slices in the first size category;
    receiving an encoded video frame having a plurality of slices; and
    at a decoder, decoding the encoded frame by using the available parallel task threads to start decoding of all slices in the first size category before starting decoding of any slice in the second size category, wherein at least one slice belongs to each of the first and second categories, wherein each of the slice sizes is specified as a number of macroblocks in the slice.

14. The method of claim 13, wherein two or more slices of a same size category are different in size.

15. The method of claim 13, wherein all slices in the first size category are larger in size than all slices in the second size category.

16. The method of claim 15, wherein a ratio between a slice size of the first size category and a slice size of the second size category is larger than a minimum ratio.

17. The method of claim 15, wherein the number of slices in the second size category is equal to the total number of slices for the video frame minus the number of slices in the first size category.

18. A non-transitory computer readable medium storing a computer program for execution by at least one processing unit, the computer program for decoding a video frame, the computer program comprising sets of instructions for:
- identifying, based on a set of available computing resources, a plurality of size categories that specify a plurality of different video frame slice sizes;
- setting a number of slices in a first size category equal to a number of parallel task threads available to decode the slices of the video frame;
- setting a number of slices in a second size category based on a total number of slices for the frame and the number of slices in the first size category;
- receiving an encoded video frame comprising a plurality of slices; and
- decoding the encoded video frame by (i) associating each of the plurality of slices in the received video frame with one of the identified size categories and (ii) starting decoding of all slices associated with one size category before starting decoding of any slice associated with any other size category, wherein at least one size category is associated with slices of two or more different sizes, wherein at least one slice belongs to each of the first and second categories, wherein each of the slice sizes is specified as a number of macroblocks in the slice.

19. The computer readable medium of 18, wherein all slices in the first size category are larger in size than all slices in the second size category.

20. The computer readable medium of claim 19, wherein at least one slice associated with the second size category references a slice associated with the first size category for decoding.

21. The computer readable medium of claim 19, wherein the computer program further comprises sets of instructions for:
- setting the number of slices in the second size category to equal the total number of slices for the frame minus the number of slices in the first size category.

* * * * *

UNITED STATES PATENT AND TRADEMARK OFFICE
CERTIFICATE OF CORRECTION

PATENT NO. : 8,223,845 B1
APPLICATION NO. : 11/083630
DATED : July 17, 2012
INVENTOR(S) : Christian L. Duvivier Page 1 of 1

It is certified that error appears in the above-identified patent and that said Letters Patent is hereby corrected as shown below:

In the Claims:

Claim 5, column 17, line 61, "first category" should read "first size category".

Claim 5, column 17, line 62, "category such that the percentage" should read "size category such that a percentage".

Claim 5, column 17, line 63, "first category" should read "first size category".

Signed and Sealed this
Fourth Day of June, 2013

Teresa Stanek Rea
*Acting Director of the United States Patent and Trademark Office*